United States Patent
Park et al.

(10) Patent No.: US 11,461,043 B2
(45) Date of Patent: Oct. 4, 2022

(54) STORAGE DEVICE SET INCLUDING STORAGE DEVICE AND RECONFIGURABLE LOGIC CHIP, AND STORAGE SYSTEM INCLUDING STORAGE DEVICE SET

(71) Applicant: Samsung Electronics Co., Ltd., Suwon-si (KR)

(72) Inventors: Jae-geun Park, Suwon-si (KR); Phil-yong Jung, Hwaseong-si (KR); Ho-jun Shim, Yongin-si (KR); Sang-young Ye, Osan-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 84 days.

(21) Appl. No.: 17/078,549

(22) Filed: Oct. 23, 2020

(65) Prior Publication Data

US 2021/0042057 A1 Feb. 11, 2021

Related U.S. Application Data

(63) Continuation of application No. 16/263,467, filed on Jan. 31, 2019, now Pat. No. 10,817,214.

(30) Foreign Application Priority Data

Jun. 7, 2018 (KR) .......................... 10-2018-0065657

(51) Int. Cl.
*G06F 3/06* (2006.01)
*G06F 13/16* (2006.01)

(52) U.S. Cl.
CPC ............ *G06F 3/0658* (2013.01); *G06F 3/061* (2013.01); *G06F 3/0631* (2013.01);
(Continued)

(58) Field of Classification Search
CPC ...... G06F 3/061; G06F 3/0631; G06F 3/0658; G06F 3/0659; G06F 3/0688; G06F 13/1668
See application file for complete search history.

(56) References Cited

U.S. PATENT DOCUMENTS 8,850,128 B2 9/2014 Chu et al.
8,886,956 B2 11/2014 Lee et al.
(Continued)

FOREIGN PATENT DOCUMENTS

EP 2879041 A1 6/2015

OTHER PUBLICATIONS

Extended Search Report dated Aug. 28, 2019 in European Application No. 19157281.7.
(Continued)

*Primary Examiner* — Eric T Oberly
(74) *Attorney, Agent, or Firm* — Harness, Dickey & Pierce, P.L.C.

(57) ABSTRACT

A storage device set includes a storage device configured to communicate with a host, the storage device including a controller configured to generate encrypted input data by encrypting data; and a reconfigurable logic chip configured to receive the encrypted input data from the storage device, generate processed data by processing the encrypted input data according to a configuration, and generate encrypted output data by encrypting the processed data.

20 Claims, 23 Drawing Sheets

(52) U.S. Cl.
CPC .......... *G06F 3/0659* (2013.01); *G06F 3/0688* (2013.01); *G06F 13/1668* (2013.01)

(56) References Cited

U.S. PATENT DOCUMENTS

| | | | |
|---|---|---|---|
| 9,304,730 | B2 | 4/2016 | Bittner et al. |
| 9,619,167 | B2 | 4/2017 | Khan et al. |
| 9,658,977 | B2 | 5/2017 | Trout et al. |
| 9,735,962 | B1 | 8/2017 | Yang et al. |
| 9,852,779 | B2 | 12/2017 | Lee |
| 2008/0126749 | A1 | 5/2008 | Tom et al. |
| 2013/0124874 | A1 | 5/2013 | Kudelski |
| 2013/0159622 | A1 | 6/2013 | Cohen |
| 2015/0149695 | A1* | 5/2015 | Khan ................ G06F 3/0641 711/162 |
| 2015/0149789 | A1 | 5/2015 | Seo et al. |
| 2015/0155876 | A1 | 6/2015 | Jayasena et al. |
| 2016/0094619 | A1* | 3/2016 | Khan ................ G06F 15/7821 709/203 |
| 2016/0335215 | A1 | 11/2016 | Biran et al. |
| 2017/0091127 | A1* | 3/2017 | Khan ................ G06F 13/4282 |
| 2017/0124337 | A1 | 5/2017 | Li et al. |
| 2017/0177404 | A1* | 6/2017 | Drysdale ................ G06F 9/546 |
| 2018/0062829 | A1* | 3/2018 | Suresh ................ H04L 9/0631 |
| 2018/0114013 | A1 | 4/2018 | Sood et al. |
| 2019/0006319 | A1 | 1/2019 | Karhade et al. |
| 2019/0102565 | A1* | 4/2019 | Boyd ................ G06F 3/0623 |
| 2020/0234411 | A1* | 7/2020 | Xu ................ H04N 9/07 |

OTHER PUBLICATIONS

Office Action issued by the Intellectual Property India office for Application No. 201934022410 dated Mar. 13, 2021.

* cited by examiner

STORAGE DEVICE SET INCLUDING STORAGE DEVICE AND RECONFIGURABLE LOGIC CHIP, AND STORAGE SYSTEM INCLUDING STORAGE DEVICE SET

CROSS-REFERENCE TO RELATED APPLICATION

This application is a continuation of U.S. application Ser. No. 16/263,467, filed on Jan. 31, 2019, which claims the benefit of Korean Patent Application No. 10-2018-0065657, filed on Jun. 7, 2018, in the Korean Intellectual Property Office, the entire disclosure of each of which is incorporated herein in its entirety by reference.

BACKGROUND

Example embodiments of the inventive concepts relate to a storage device, a storage system including the same and/or a method of operating the same. For example, at least some example embodiments relate to a storage device set including a storage device and a reconfigurable logic chip, a storage system including the storage device set, and/or a method of operating the storage device.

To improve the processing speed of a storage system, an accelerator may be added to the storage system, the accelerator assists calculations of a host by performing some of the calculations usually performed by the host. Conventionally, the accelerator may be a dedicated hardware accelerator that performs a set function, and as such, the host may support the entire data flow, which may result overhead for the host.

SUMMARY

Recently, the host is required to process each of various applications at a high speed. To reduce overhead of the host, in one or more example embodiments, a reconfigurable accelerator is reconfigurable according to a design file such as a field-programmable gate array (FPGA) to correspond to various applications.

Some example embodiments of the inventive concepts provide a storage device set including a storage device and a reconfigurable logic chip, a storage system including the storage device set, and/or a method of operating the storage device, whereby overhead of a host may be reduced.

According to an example embodiment of the inventive concepts, there is provided a storage device set including a storage device configured to communicate with a host, the storage device including a controller configured to generate encrypted input data by encrypting data; and a reconfigurable logic chip configured to, receive the encrypted input data from the storage device, generate processed data by processing the encrypted input data according to a configuration, and generate encrypted output data by encrypting the processed data.

According to another example embodiment of the inventive concepts, there is provided a storage system including a host, a reconfigurable logic chip, and a storage device configured to, communicate with the host via a first port, and communicate with the reconfigurable logic chip via a second port such that the storage device is configured to transmit encrypted input data to the reconfigurable logic chip via the second port and receive encrypted output data from the reconfigurable logic chip via the second port.

According to another example embodiment of the inventive concepts, there is provided a method of operating a storage device, the method including receiving, via a first port of the storage device, a host command from a host, the host command including a data processing request; transmitting encrypted data and a command to a reconfigurable logic chip via a second port of the storage device, the command commanding data processing with respect to the encrypted data; and receiving, via the second port of the storage device, encrypted processed data from the reconfigurable logic chip.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
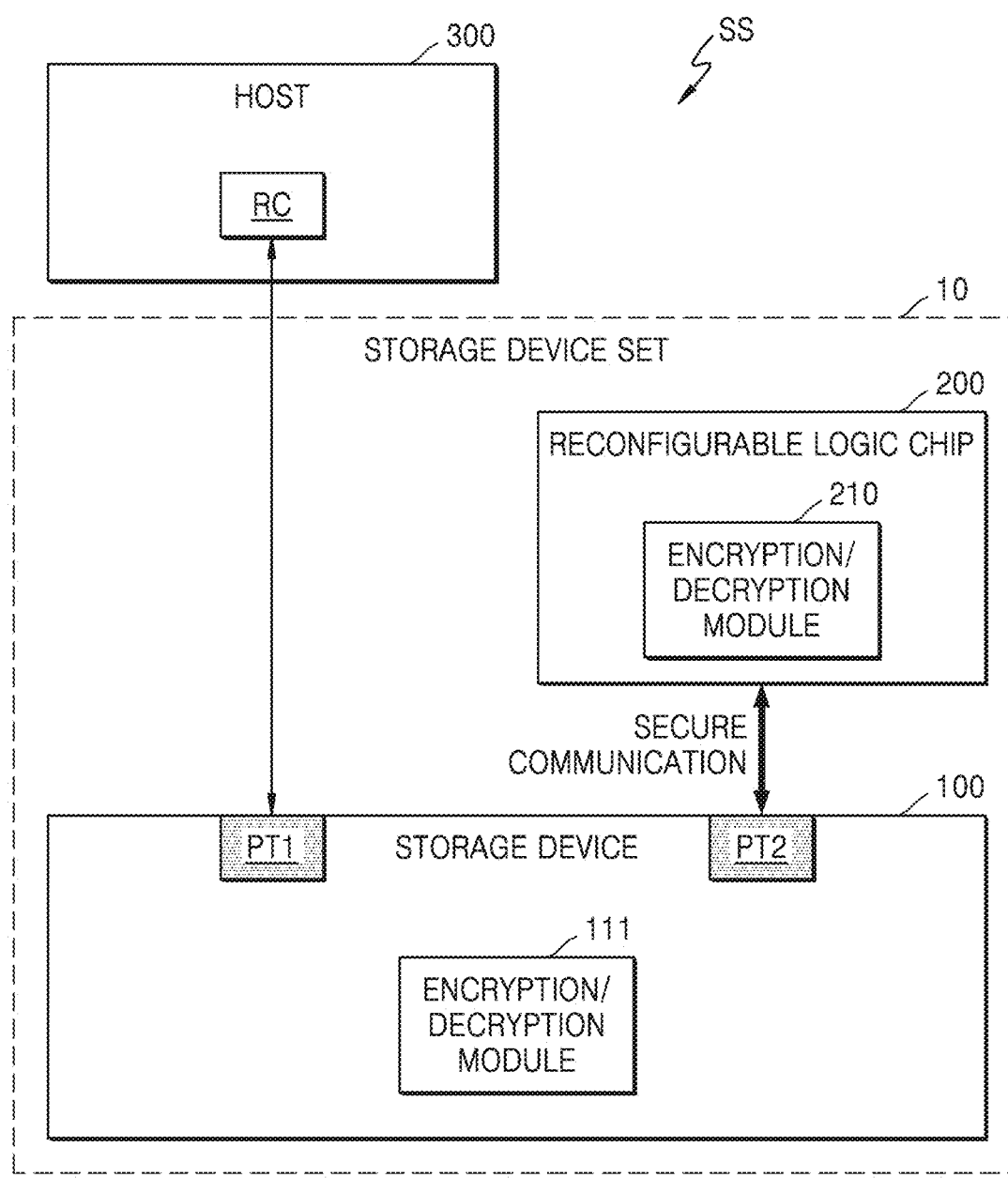
FIG. 1 is a diagram schematically illustrating a storage system, according to an example embodiment.

FIG. 1 is a diagram schematically illustrating a storage system SS, according to an example embodiment.

Referring to FIG. 1, the storage system SS may include a storage device set 10 and a host 300, and the storage device set 10 may include a storage device 100 and a reconfigurable logic chip 200. The storage device 100 may include a first port PT1 and a second port PT2, and accordingly, the storage device 100 may also be referred to as a dual-port storage device.

In an example embodiment, the storage device 100 may be implemented as a first chip, the reconfigurable logic chip 200 may be implemented as a second chip, and the first chip and the second chip may be mounted to a same board and may be electrically connected to each other. In an example embodiment, the storage device 100 may be implemented as a first chip, the reconfigurable logic chip 200 may be implemented as a second chip, and the first chip and the second chip may configure a package-on-package (PoP). However, the inventive concepts are not limited thereto, and the storage device 100 and the reconfigurable logic chip 200 may be electrically connected to each other via various configurations to form the storage device set 10.

In an example embodiment, the reconfigurable logic chip 200 may be a field-programmable gate array (FPGA) chip. However, example embodiments of the inventive concepts are not limited thereto, and the reconfigurable logic chip 200 may be a programmable logic device (PLD) or a complex PLD (CPLD). The reconfigurable logic chip 200 may be used as an accelerator to assist calculations of the host 300 by performing some of the calculations typically performed by the host 300.

The storage device 100 may communicate with the host 300 via the first port PT1. In more detail, the storage device 100 may communicate with the host 300 via the first port PT1 according to a first interface protocol. For example, the first interface protocol may include Peripheral Component Interconnect Express (PCIe). However, example embodiments of the inventive concepts are not limited thereto, and the first interface protocol may include Universal Serial Bus (USB), PCI, AT Attachment (ATA), Serial AT Attachment (SATA), Parallel AT Attachment (PATA), Small Computer System Interface (SCSI), Serial Attached SCSI (SAS), Enhanced Small Disk Interface (ESDI), Integrated Drive Electronics (IDE), or the like.

In an example embodiment, the first port PT1 may be connected to a PCIe bus, and the host 300 may include a root complex RC connected to the PCIe bus. The root complex RC may manage transaction between the host 300 and the storage device 100. For example, the root complex RC may route messages related to the transaction. For example, the root complex generates transaction requests on behalf of a central processing unit (CPU). The root complex RC may include root ports, root complex register blocks, or logical aggregation of end points where a root complex is integrated.

In an example embodiment, the root complex RC may be directly connected to the storage device 100. In an example embodiment, the root complex RC may be connected to the storage device 100 via at least one interface switch. In an example embodiment, the root complex RC may be embodied as a device separated from the CPU included in the host 300. In an example embodiment, the root complex RC may be implemented to be integrated with the CPU included in the host 300.

The storage device 100 may communicate with the reconfigurable logic chip 200 via the second port PT2. In more detail, the storage device 100 may communicate with the reconfigurable logic chip 200 via the second port PT2 according to a second interface protocol. In this manner, the reconfigurable logic chip 200 may not include a port that is directly connected to the host 300, and the host 300 may communicate with the reconfigurable logic chip 200 via the storage device 100.

In an example embodiment, the storage device 100 and the reconfigurable logic chip 200 may perform secure communication. The storage device 100 may transmit encrypted data to the reconfigurable logic chip 200 via the second port PT2 and may receive encrypted data from the reconfigurable logic chip 200 via the second port PT2. In more detail, the storage device 100 may include an encryption/decryption module 111, and the encryption/decryption module 111 may generate encrypted data by encrypting data. In addition, the reconfigurable logic chip 200 may include an encryption/decryption module 210, and the encryption/decryption module 210 may decrypt encrypted data received from the storage device 100, and may encrypt data processed by the reconfigurable logic chip 200.

In an example embodiment, the storage device 100 may be a block storage device that manages data in a unit of a block. In an example embodiment, the storage device 100 may be an object storage device that manages data in a unit of an object. For example, the storage device 100 may be a key-value storage device. The key-value storage device refers to a device configured to rapidly and simply process data by using a key-value pair. In this regard, the key-value pair is a pair of a key having uniqueness and a value that is data corresponding to the key, and may also be referred to as a tuple or a key-value tuple. In the key-value pair, the key may be expressed as a random string such as a file name, a Uniform Resource Identifier (URI), or a hash, and the value may be an image or a random kind of data such as a user-desired file or document.

The storage system SS may be embodied as a personal computer (PC), a data server, a network-combined storage, an Internet of Things (IoT) device, or a portable electronic device. The portable electronic device may include, but is not limited to, a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an electronic-book (e-book), a wearable device, or the like.

In some example embodiments, the storage device 100 may be an internal memory embedded into an electronic device. For example, the storage device 100 may be a solid-stage drive (SSD), an embedded Universal Flash Storage (UFS) memory device, or an embedded Multi-Media Card (eMMC). In some example embodiments, the storage device 100 may be an external memory detachable from the electronic device. For example, the storage device 100 may include, but is not limited to, an UFS memory card, a Compact Flash (CF) storage device, a Secure Digital (SD) memory card, a micro-SD memory card, a mini-SD memory card, an extreme digital (xD) memory card, or a memory stick.

Figure 2:
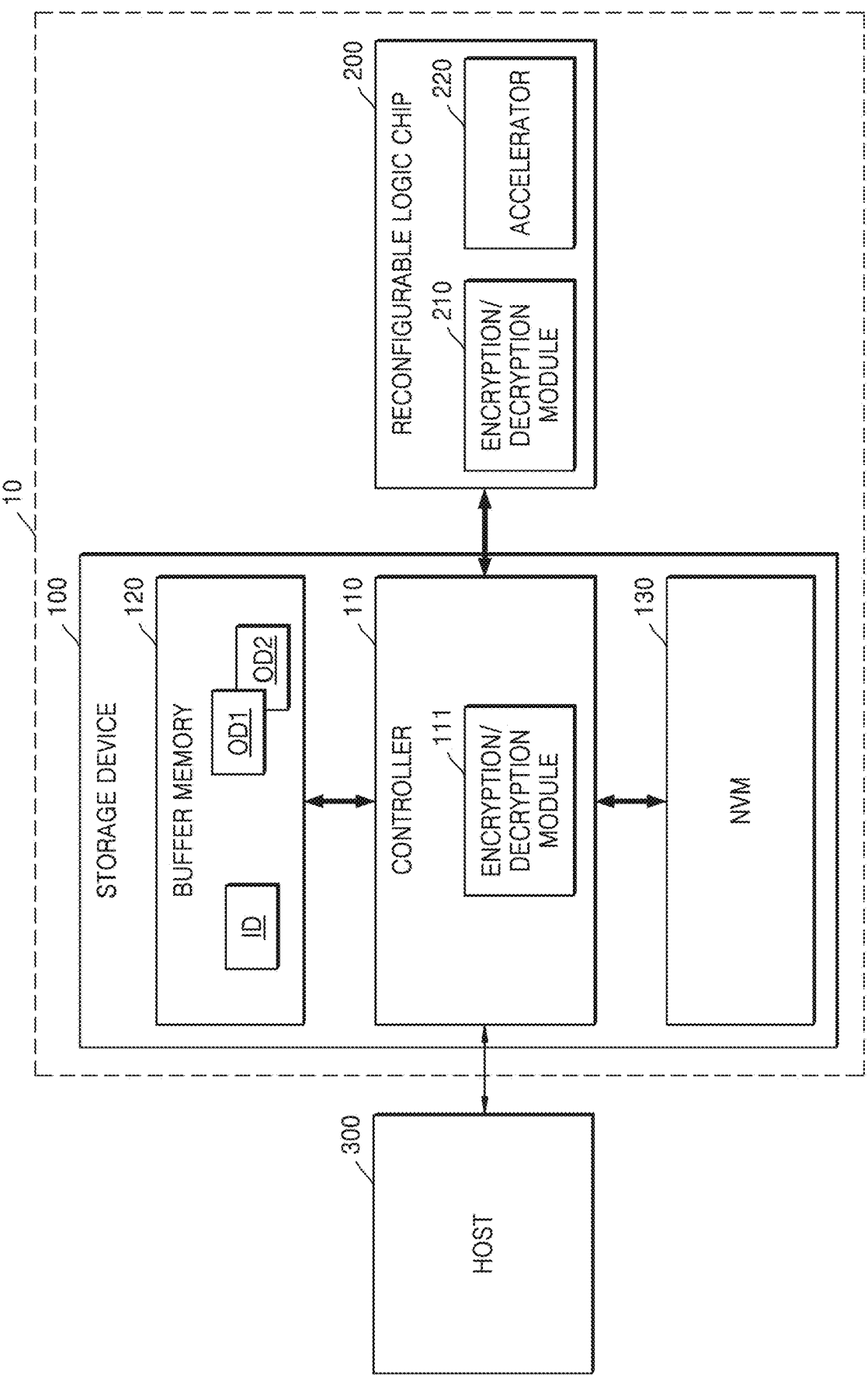
FIG. 2 is a block diagram of a storage device set, according to an example embodiment.

FIG. 2 is a block diagram of the storage device set 10, according to an example embodiment.

Referring to FIG. 2, the storage device 100 may include a controller 110, a buffer memory 120, and a non-volatile memory 130, and the controller 110 may include the encryption/decryption module 111. In an example embodiment, the controller 110, the buffer memory 120, and the non-volatile memory 130 may be embodied as respective chips. In an example embodiment, the controller 110 and the buffer memory 120 may perform secure communication. In an example embodiment, the controller 110 and the non-volatile memory 130 may perform secure communication. In an example embodiment, the controller 110 and the reconfigurable logic chip 200 may perform secure communication.

The reconfigurable logic chip 200 may include the encryption/decryption module 210 and an accelerator 220. The encryption/decryption module 210 may receive encrypted input data from the storage device 100 and may generate decrypted data by decrypting the encrypted input data. Also, the encryption/decryption module 210 may receive processed data from the accelerator 220 and may generate encrypted output data by encrypting the processed data. In some example embodiments, the reconfigurable logic chip 200 may further include a root complex, and data received from the storage device 100 may be transmitted to the encryption/decryption module 210 via the root complex.

The accelerator 220 may perform a data processing operation according to a desired (or, alternatively, a predetermined) configuration. The reconfigurable logic chip 200 may be reconfigured during an operation, and therefore, the accelerator 220 may be changed to a second accelerator while the accelerator 220 operates as a first accelerator. For example, the accelerator 220 may perform multimedia transcoding, erasure coding, or the like. For example, the accelerator 220 may perform a machine learning algorithm such as a convolutional neural network (CNN), a recurrent neural network (RNN), or the like.

Further, for example, the accelerator 220 may perform inline processing, pre-processing, pre-filtering, cryptography, compression, protocol bridging, or the like. For example, the accelerator 220 may perform a sorting calculation, a searching calculation, a logic calculation, or one or more of four fundamental arithmetic calculations. The logic calculation may refer to calculations performed by various logic gates including an AND gate, an OR gate, an XOR gate, an NOR gate, a NAND gate, and the like, or a calculation operation where at least two of the calculations are combined. The calculation operation performed by the accelerator 220 is not limited to the aforementioned examples, and may be a random calculation corresponding to some of the calculations performed by the host 300.

The host 300 may transmit a host command including a data processing request to the storage device 100. In response to the host command, the storage device 100 may transmit a command commanding data processing to the reconfigurable logic chip 200. Also, the storage device 100 may transmit processing-target data to the reconfigurable logic chip 200. For example, in an example embodiment, the encryption/decryption module 111 may generate encrypted input data by encrypting the processing-target data, and the controller 110 may transmit the encrypted input data to the reconfigurable logic chip 200.

The reconfigurable logic chip 200 may receive a command and data, may generate processed data by performing data processing on the received data, and may transmit the processed data to the storage device 100. For example, in an example embodiment, the encryption/decryption module 210 may generate decrypted data by decrypting the encrypted input data and may provide the decrypted data to the accelerator 220. The accelerator 220 may generate the processed data by performing data processing on the decrypted data, and may provide the processed data to the encryption/decryption module 210. The encryption/decryption module 210 may generate encrypted output data by encrypting the processed data.

Also, the host 300 may transmit a host command including a write request or a read request to the storage device 100, and the storage device 100 may read data from the non-volatile memory 130, in response to the read request, and may write data to the non-volatile memory 130, in response to the write request. The controller 110 may control the non-volatile memory 130 to write data to the non-volatile memory 130, in response to the write request received from the host 300, or may control the non-volatile memory 130 to read data from the non-volatile memory 130, in response to the read request received from the host 300.

The buffer memory 120 may buffer input data ID to be processed by the reconfigurable logic chip 200. In an example embodiment, the input data ID may be encrypted data. However, example embodiments of the inventive concepts are not limited thereto, and in some example embodiments, the input data ID may be normal data that is not encrypted. Also, the buffer memory 120 may buffer data processed by the reconfigurable logic chip 200, e.g., first output data OD1 and second output data OD2. In an example embodiment, the first output data OD1 and the second output data OD2 may be encrypted data. However, example embodiments of the inventive concepts are not limited thereto, and in some example embodiments, the first output data OD1 and the second output data OD2 may be normal data. For example, the buffer memory 120 may be a volatile memory such as dynamic random-access memory (DRAM).

In an example embodiment, the buffer memory 120 may be a control memory buffer (CMB). The host 300 and the reconfigurable logic chip 200 may access the buffer memory 120. Accordingly, even if the host 300 and the reconfigurable logic chip 200 are not directly connected to each other, the host 300 and the reconfigurable logic chip 200 may exchange data via the buffer memory 120.

For example, the host 300 may load data into the buffer memory 120, the data being to be processed by the reconfigurable logic chip 200, and the reconfigurable logic chip 200 may process the data loaded into the buffer memory 120. For example, the reconfigurable logic chip 200 may load processed data into the buffer memory 120, and then the host 300 may read the processed data having loaded into the buffer memory 120. In this manner, the host 300 may access the buffer memory 120, such that, after data processing by the reconfigurable logic chip 200 is completed, the storage device 100 may not provide the processed data to the host 300 but may transmit a response message indicating completion of the data processing to the host 300.

The non-volatile memory 130 may include a memory cell array including a plurality of memory cells. In an example embodiment, the non-volatile memory 130 may include a flash memory device, e.g., a NAND flash memory device. However, example embodiments of the inventive concepts are not limited thereto, and the non-volatile memory 130 may include a resistive memory device such as resistive RAM (ReRAM), phase change RAM (PRAM), magnetic RAM (MRAM), and the like.

Figure 3:
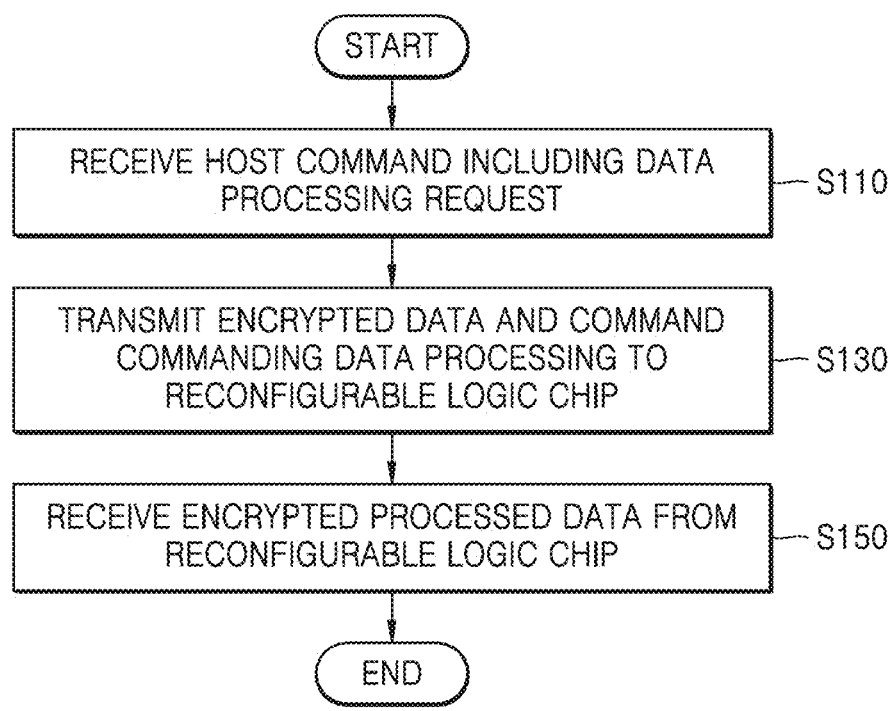
FIG. 3 is a flowchart of a method of operating the storage device, according to an example embodiment.

FIG. 3 is a flowchart of a method of operating the storage device 100, according to an example embodiment.

Referring to FIG. 3, the method of operating the storage device 100 according to the present example embodiment may include operations that are performed in chronological order by the storage device 100 of FIG. 2. Hereinafter, descriptions will now be provided with reference to FIGS. 2 and 3.

In operation S110, the storage device 100 receives a host command including a data processing request from the host 300. In an example embodiment, the storage device 100 may receive data along with the host command. In an example embodiment, the storage device 100 may receive the host command and then may receive the data from the host 300. In an example embodiment, the storage device 100 may read the data from the buffer memory 120 or the non-volatile memory 130.

In operation S130, the storage device 100 transmits encrypted data and a command commanding data processing to the reconfigurable logic chip 200. In an example embodiment, the storage device 100 may transmit a command to the reconfigurable logic chip 200 and then, in response to a read request from the reconfigurable logic chip 200, the storage device 100 may transmit the encrypted data to the reconfigurable logic chip 200. In an example embodiment, the storage device 100 may transmit the command with the encrypted data to the reconfigurable logic chip 200.

In an example embodiment, between operation S110 and operation S130, the storage device 100 may perform a data encryption operation. For example, the encryption/decryption module 111 may encrypt data to be processed by the reconfigurable logic chip 200. In an embodiment, the storage device 100 may read the encrypted data from the buffer memory 120 or the non-volatile memory 130. In an example embodiment, the storage device 100 may receive the encrypted data from the host 300.

In operation S150, the storage device 100 receives encrypted processed data from the reconfigurable logic chip 200. In an embodiment, the storage device 100 may store the encrypted processed data in the buffer memory 120 or the non-volatile memory 130. In an example embodiment, the storage device 100 may transmit the encrypted processed data to the host 300. In an example embodiment, the storage device 100 may decrypt the encrypted processed data. In an example embodiment, the storage device 100 may store decrypted processed data in the buffer memory 120 or the non-volatile memory 130. In an example embodiment, the storage device 100 may transmit the decrypted processed data to the host 300.

Figure 4:
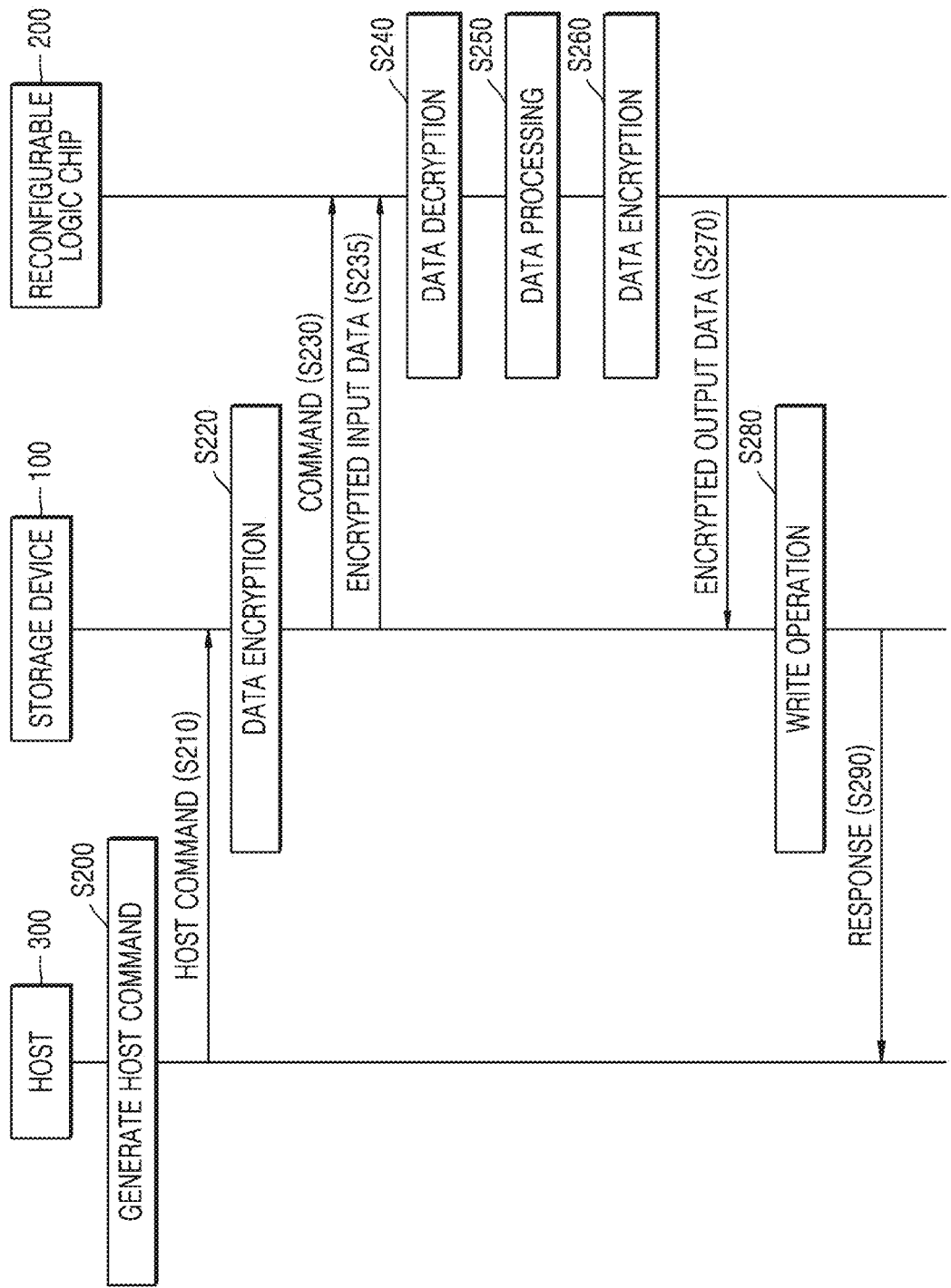
FIG. 4 is a flowchart illustrating an example of operations among a host, the storage device, and a reconfigurable logic chip of FIG. 2.

FIG. 4 is a flowchart illustrating an example of operations among the host 300, the storage device 100, and the reconfigurable logic chip 200 of FIG. 2.

Referring to FIG. 4, in operation S200, the host 300 generates a host command including a data processing request. For example, in response to a user input of commanding execution of an image recognition application, the host 300 may generate a host command commanding a CNN required for image recognition by the reconfigurable logic chip 200. In operation S210, the host 300 may transmit the host command to the storage device 100.

In regards to the storage device 100, in operation S220, the storage device 100 generates encrypted input data by encrypting data to be processed by the reconfigurable logic chip 200. For example, the storage device 100 may generate encrypted input data by encrypting an image file that is a target of the image recognition. For example, the storage device 100 may encrypt data received from the host 300, or data read from the buffer memory 120 or the non-volatile memory 130. In an example embodiment, the storage device 100 may receive encrypted data, and in this case, operation S220 may be skipped. In operation S230, the storage device 100 transmits a command commanding data processing to the reconfigurable logic chip 200. In operation S235, the storage device 100 transmits the encrypted input data to the reconfigurable logic chip 200.

In regards to the reconfigurable logic chip 200, in operation S240, the reconfigurable logic chip 200 generates decrypted data by decrypting the encrypted input data. In operation S250, the reconfigurable logic chip 200 generates processed data by processing the decrypted data according to a desired (or, alternatively, a predetermined) configuration. In operation S260, the reconfigurable logic chip 200 generates encrypted output data by encrypting the processed data. In operation S270, the reconfigurable logic chip 200 transmits the encrypted output data to the storage device 100.

In operation S280, the storage device 100 performs a write operation with respect to the encrypted output data. For example, the storage device 100 may write the encrypted output data to the buffer memory 120 or the non-volatile memory 130. In an example embodiment, the storage device 100 may decrypt the encrypted output data, and may perform the write operation with respect to the decrypted output data. In operation S290, the storage device 100 transmits a response message indicating completion of the data processing to the host 300.

Figure 5:
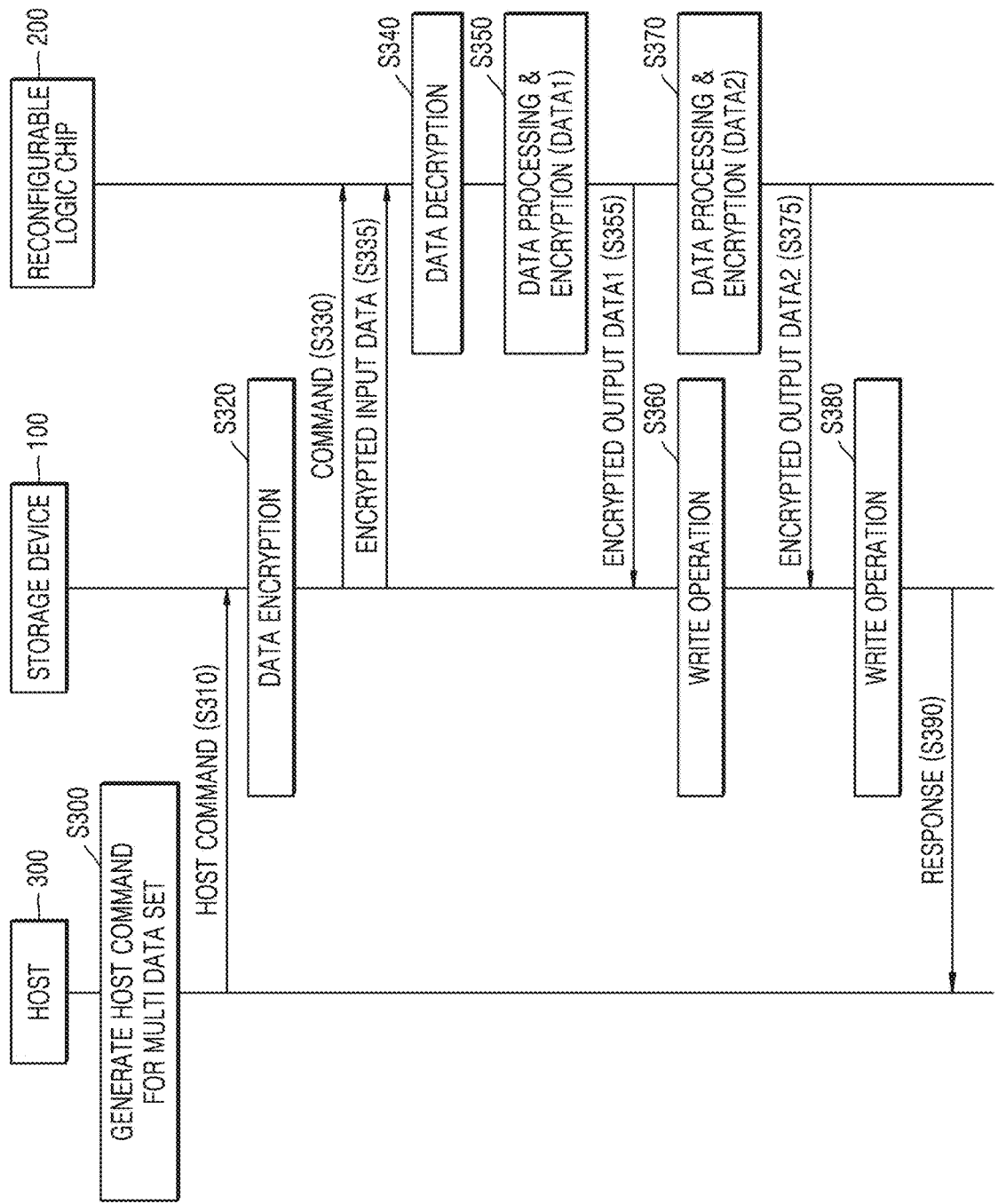
FIG. 5 is a flowchart illustrating another example of operations among the host, the storage device, and the reconfigurable logic chip of FIG. 2.

FIG. 5 is a flowchart illustrating another example of operations among the host 300, the storage device 100, and the reconfigurable logic chip 200 of FIG. 2.

Referring to FIG. 5, the present example corresponds to modification of the example of FIG. 4, and will now be described with respect to a difference between the operations of the present example and the operations of the example of FIG. 4.

In operation S300, the host 300 generates a host command including a multi data set processing request, i.e., a host command commanding processing of a multi data set. In this regard, the multi data set refers to a plurality of data related to the host command. Also, the host command including the multi data set processing request may command the reconfigurable logic chip 200 to output the plurality of data, i.e., the multi data set, by performing a plurality of data processing operations in response to the host command. For example, the host command including the multi data set processing request may be a transcoding command. In operation S310, the host 300 transmits the host command to the storage device 100.

In operation S320, the storage device 100 generates encrypted input data by encrypting data to be processed by the reconfigurable logic chip 200. For example, the storage device 100 may generate the encrypted input data by encrypting a multimedia file that is a transcoding target. In operation S330, the storage device 100 transmits a command commanding data processing to the reconfigurable logic chip 200. In operation S335, the storage device 100 transmits the encrypted input data to the reconfigurable logic chip 200. For example, the encrypted input data may be encrypted data of a multimedia file having a scalable format.

In operation S340, the reconfigurable logic chip 200 generates decrypted data by decrypting the encrypted input data. For example, the reconfigurable logic chip 200 may generate the multimedia file having a scalable format by decrypting the encrypted input data.

In operation S350, the reconfigurable logic chip 200 generates first processing data by processing the decrypted data according to a predetermined configuration and generates encrypted first output data by encrypting the first processing data. For example, the reconfigurable logic chip 200 may generate a first multimedia file having a first format by performing transcoding on the multimedia file having a scalable format. Then, the reconfigurable logic chip 200 may generate an encrypted first multimedia file by encrypting the first multimedia file. In operation S355, the reconfigurable logic chip 200 transmits the encrypted first output data to the storage device 100. For example, the reconfigurable logic chip 200 may transmit the encrypted first multimedia file to the storage device 100.

In operation S360, the storage device 100 performs a write operation on the encrypted first output data. For example, the storage device 100 may write the encrypted first multimedia file to the buffer memory 120 or the non-volatile memory 130.

In operation S370, the reconfigurable logic chip 200 generates second processed data by processing the decrypted data according to the desired (or, alternatively, the predetermined) configuration and generates encrypted second output data by encrypting the second processing data. For example, the reconfigurable logic chip 200 may generate a second multimedia file having a second format by performing transcoding on the multimedia file having a scalable format. Then, the reconfigurable logic chip 200 may generate an encrypted second multimedia file by encrypting the second multimedia file. In an example embodiment, operation S370 may be performed while operations S355 and S360 are performed. However, example embodiments of the inventive concepts are not limited thereto, and operation S370 may be performed before operation S355. In operation S370, the reconfigurable logic chip 200 transmits the encrypted second output data to the storage device 100. For example, the reconfigurable logic chip 200 may transmit the encrypted second multimedia file to the storage device 100.

In operation S380, the storage device 100 performs a write operation on the encrypted second output data. For example, the storage device 100 may write the encrypted second multimedia file to the buffer memory 120 or the non-volatile memory 130. In operation S390, the storage device 100 transmits a response message indicating completion of the data processing to the host 300.

Figure 6:
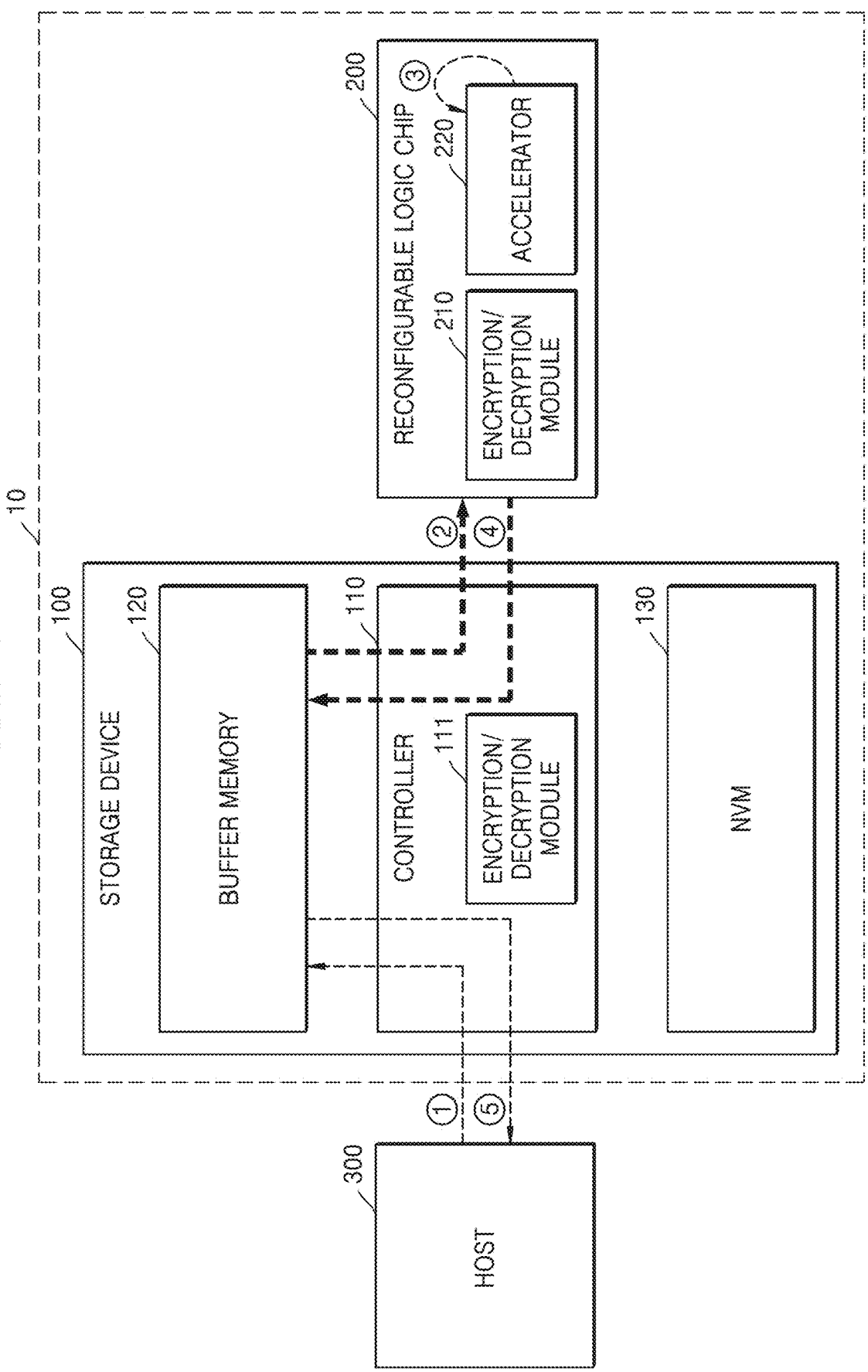
FIG. 6 illustrates an example of operations of the storage device set illustrated in FIG. 2.

FIG. 6 illustrates an example of operations of the storage device set 10 illustrated in FIG. 2.

Referring to FIG. 6, in a first operation, the host 300 may transmit a host command including a data processing request and data to the storage device 100. For example, in an example embodiment, the encryption/decryption module 111 may encrypt data and may load the encrypted data into the buffer memory 120. In a second operation, the reconfigurable logic chip 200 may read the encrypted data loaded into the buffer memory 120. In another example embodiment, the storage device 100 may load data into the buffer memory 120, the data having received from the host 300. Afterward, when a read request is received from the reconfigurable logic chip 200, the encryption/decryption module 111 may encrypt the data loaded into the buffer memory 120, and may transmit the encrypted data to the reconfigurable logic chip 200. In a third operation, the encryption/decryption module 210 may decrypt the encrypted data and may provide the decrypted data to the accelerator 220. The accelerator 220 may generate processed data by processing the decrypted data according to a desired (or, alternatively, a predetermined) configuration. In a fourth operation, the encryption/decryption module 210 may encrypt the processed data and may write the encrypted processed data to the buffer memory 120. Then, in a fifth operation, the host 300 may read the encrypted processed data from the buffer memory 120.

Figure 7:
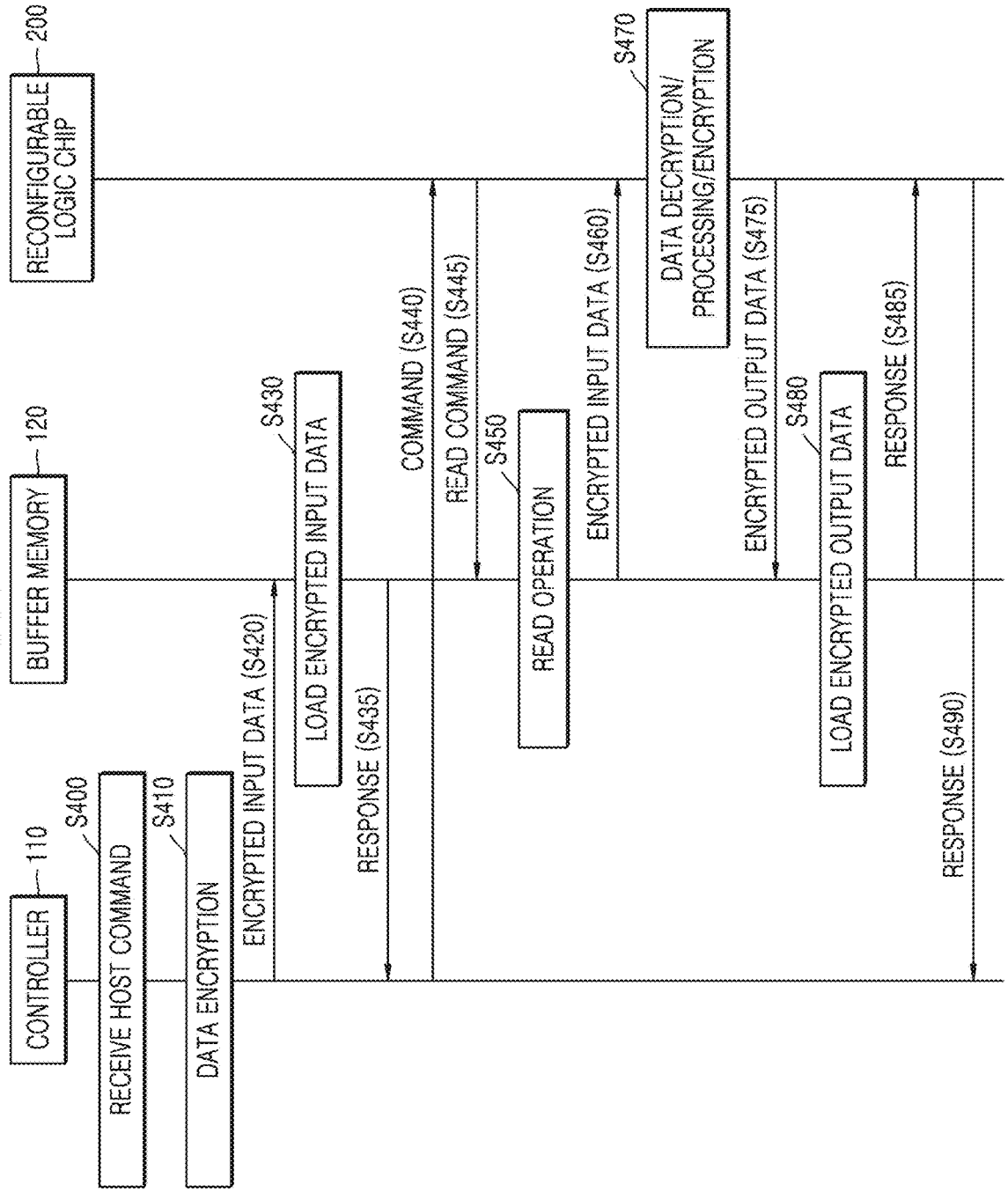
FIG. 7 is a flowchart illustrating operations among a controller, a buffer memory, and the reconfigurable logic chip of FIG. 6.

FIG. 7 is a flowchart illustrating operations among the controller 110, the buffer memory 120, and the reconfigurable logic chip 200 of FIG. 6.

Referring to FIG. 7, in operation S400, the controller 110 receives a host command including a data processing request and data from the host 300. In operation S410, the encryption/decryption module 111 included in the controller 110 generates encrypted input data by encrypting the received data. In operation S420, the controller 110 transmits the encrypted input data to the buffer memory 120.

In operation S430, the buffer memory 120 loads the encrypted input data. In operation S435, when loading of the encrypted input data is completed, the buffer memory 120 transmits a response message indicating completion of the loading to the controller 110.

In operation S440, the controller 110 transmits a command commanding data processing to the reconfigurable logic chip 200. In operation S445, the reconfigurable logic chip 200 transmits a read command to the buffer memory 120. In operation S450, the buffer memory 120 performs a read operation, and, in operation S460, transmits the encrypted input data to the reconfigurable logic chip 200.

In operation S470, the reconfigurable logic chip 200 generates decrypted data by decrypting the encrypted input data, generates processed data by processing the decrypted data, and generates encrypted output data by encrypting the processed data. In operation S475, the reconfigurable logic chip 200 transmits the encrypted output data to the buffer memory 120.

In operation S480, the buffer memory 120 loads the encrypted output data. In operation S485, the buffer memory 120 transmits a response message indicating completion of a write operation to the reconfigurable logic chip 200. In operation S490, the reconfigurable logic chip 200 transmits a response message indicating completion of the data processing to the controller 110.

Figure 8:
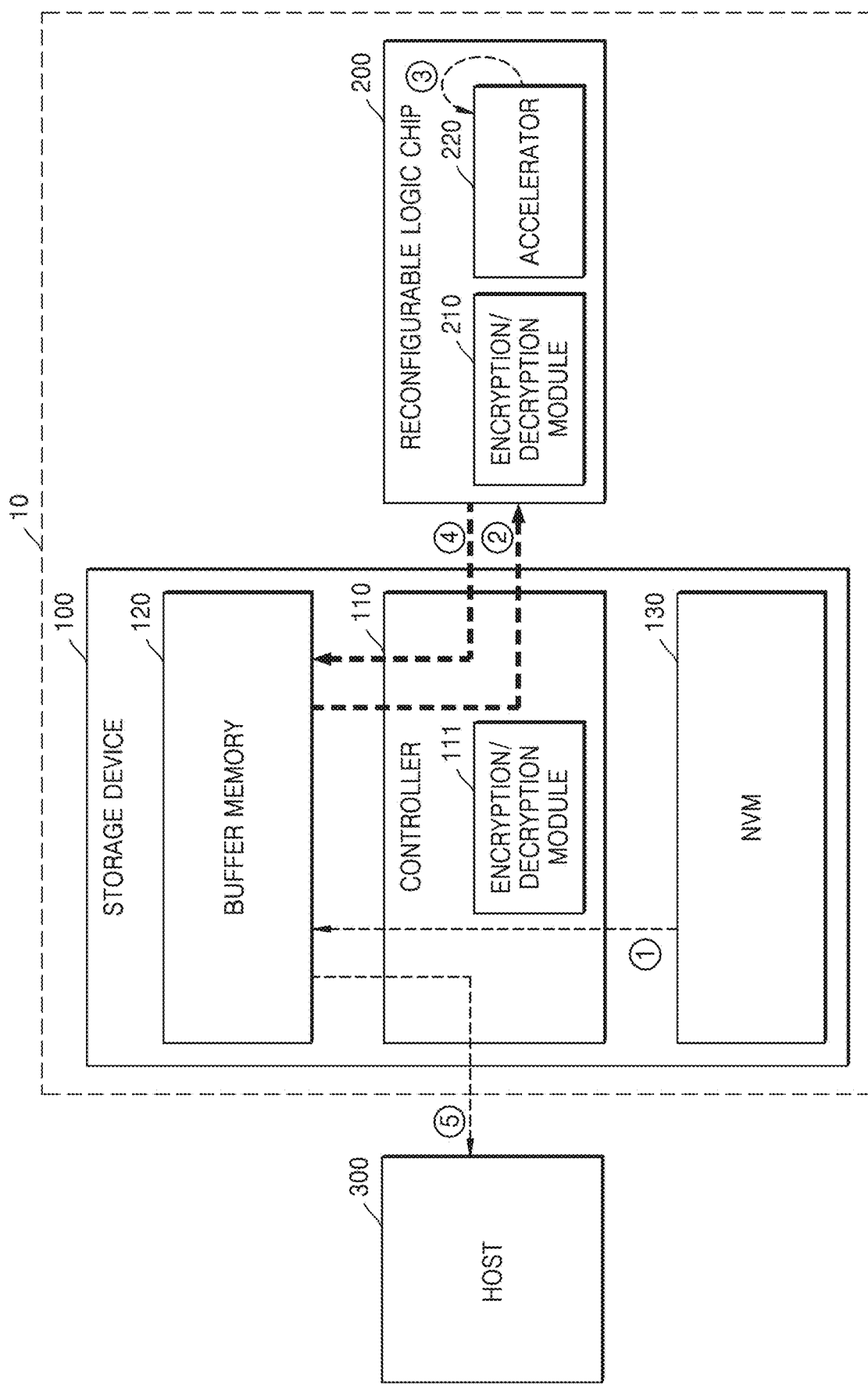
FIG. 8 illustrates another example of operations of the storage device set illustrated in FIG. 2.

FIG. 8 illustrates another example of operations of the storage device set 10 illustrated in FIG. 2.

Referring to FIG. 8, in a first operation, the host 300 may transmit a host command including a data processing request to the storage device 100, and in response thereto, the controller 110 may read data stored in the non-volatile memory 130 and may load the read data into the buffer memory 120. For example, in an example embodiment, the encryption/decryption module 111 may encrypt the read data and may provide the encrypted data to the buffer memory 120. In an example embodiment, the controller 110 may read the encrypted data from the non-volatile memory 130 and may load the read encrypted data into the buffer memory 120.

A second operation to a fifth operation may be similar to a second to fifth operation discussed with reference to FIG. 6. For example, in a second operation, the reconfigurable logic chip 200 may read the encrypted data loaded into the buffer memory 120. In a third operation, the encryption/decryption module 210 may decrypt the encrypted data and may provide the decrypted data to the accelerator 220, and the accelerator 220 may generate processed data by processing the decrypted data according to a desired (or, alternatively, a predetermined) configuration. In a fourth operation, the encryption/decryption module 210 may encrypt the processed data and may write the encrypted processed data to the buffer memory 120. Then, in a fifth operation, the host 300 may read the encrypted processed data from the buffer memory 120.

Figure 9:
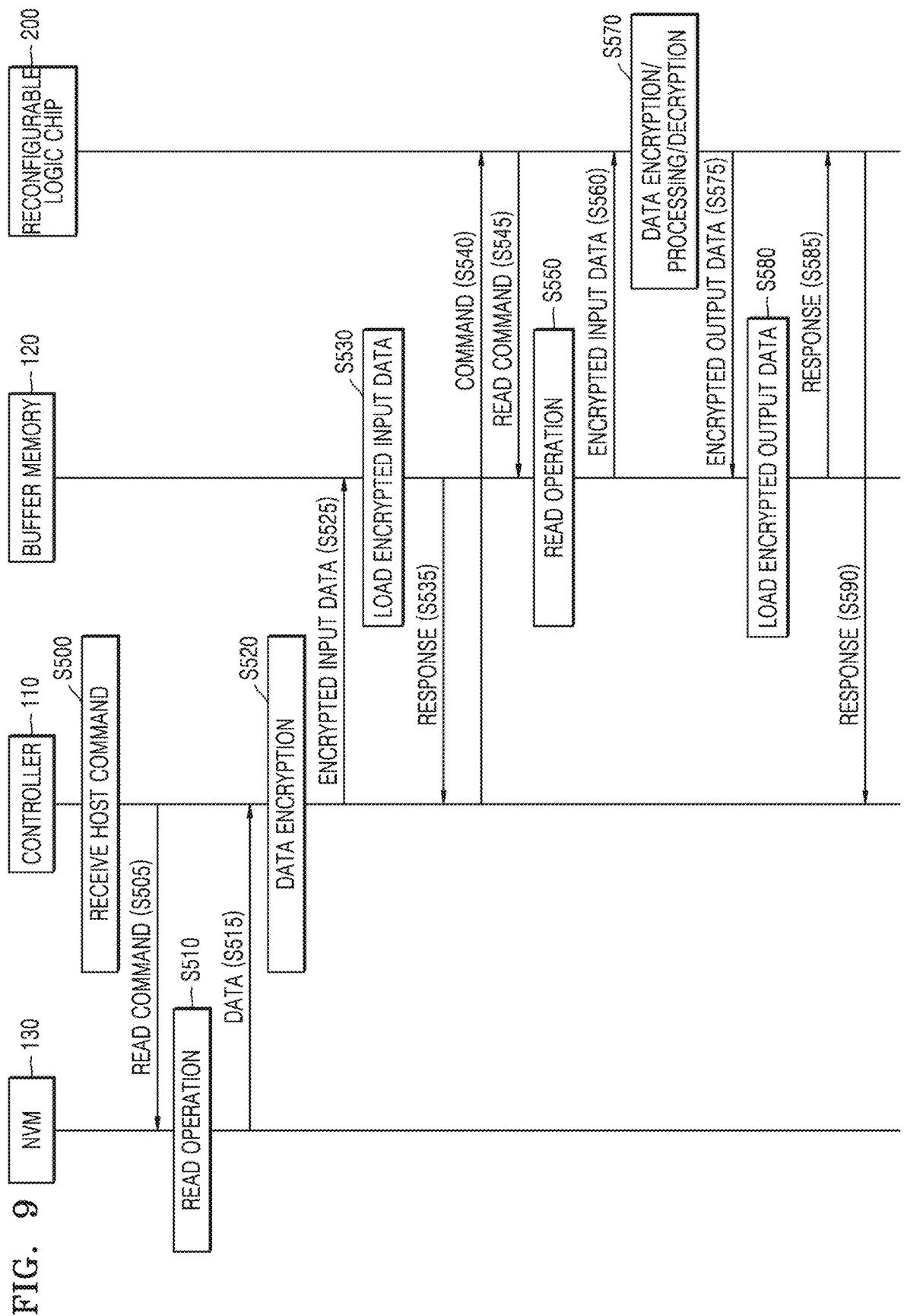
FIG. 9 is a flowchart illustrating operations among a non-volatile memory, the controller, the buffer memory, and the reconfigurable logic chip of FIG. 8.

FIG. 9 is a flowchart illustrating operations among the non-volatile memory 130, the controller 110, the buffer memory 120, and the reconfigurable logic chip 200 of FIG. 8.

Referring to FIG. 9, in operation S500, the controller 110 receives a host command including a data processing request from the host 300 (S500). In operation S505, the controller 110 transmits a read command to the non-volatile memory 130 (S505). In an example embodiment, the controller 110 may refer to a mapping table and check a physical address where processing-target data is stored and may transmit a read command including the physical address to the non-volatile memory 130. In operation S510, the non-volatile memory 130 performs a read operation, and, in operation S515, transmits data to the controller 110.

Operations S520 to S590 may be similar to operations discussed above with reference to FIG. 7. For example, the encryption/decryption module 111 included in the controller 110 generates encrypted input data by encrypting the received data (S520). The controller 110 transmits the encrypted input data to the buffer memory 120 (S525). The buffer memory 120 loads the encrypted input data (S530). When loading of the encrypted input data is completed, the buffer memory 120 transmits a response message indicating completion of the loading to the controller 110 (S535).

The controller 110 transmits a command commanding data processing to the reconfigurable logic chip 200 (S540). The reconfigurable logic chip 200 transmits a read command to the buffer memory 120 (S545). The buffer memory 120 performs a read operation (S550) and transmits the encrypted input data to the reconfigurable logic chip 200 (S560). The reconfigurable logic chip 200 generates decrypted data by decrypting the encrypted input data, generates processed data by processing the decrypted data, and generates encrypted output data by encrypting the processed data (S570). The reconfigurable logic chip 200 transmits the encrypted output data to the buffer memory 120 (S575). The buffer memory 120 loads the encrypted output data (S580). The buffer memory 120 transmits a response message indicating completion of a write operation to the reconfigurable logic chip 200 (S585). The reconfigurable logic chip 200 transmits a response message indicating completion of the data processing to the controller 110 (S590).

Figure 10:
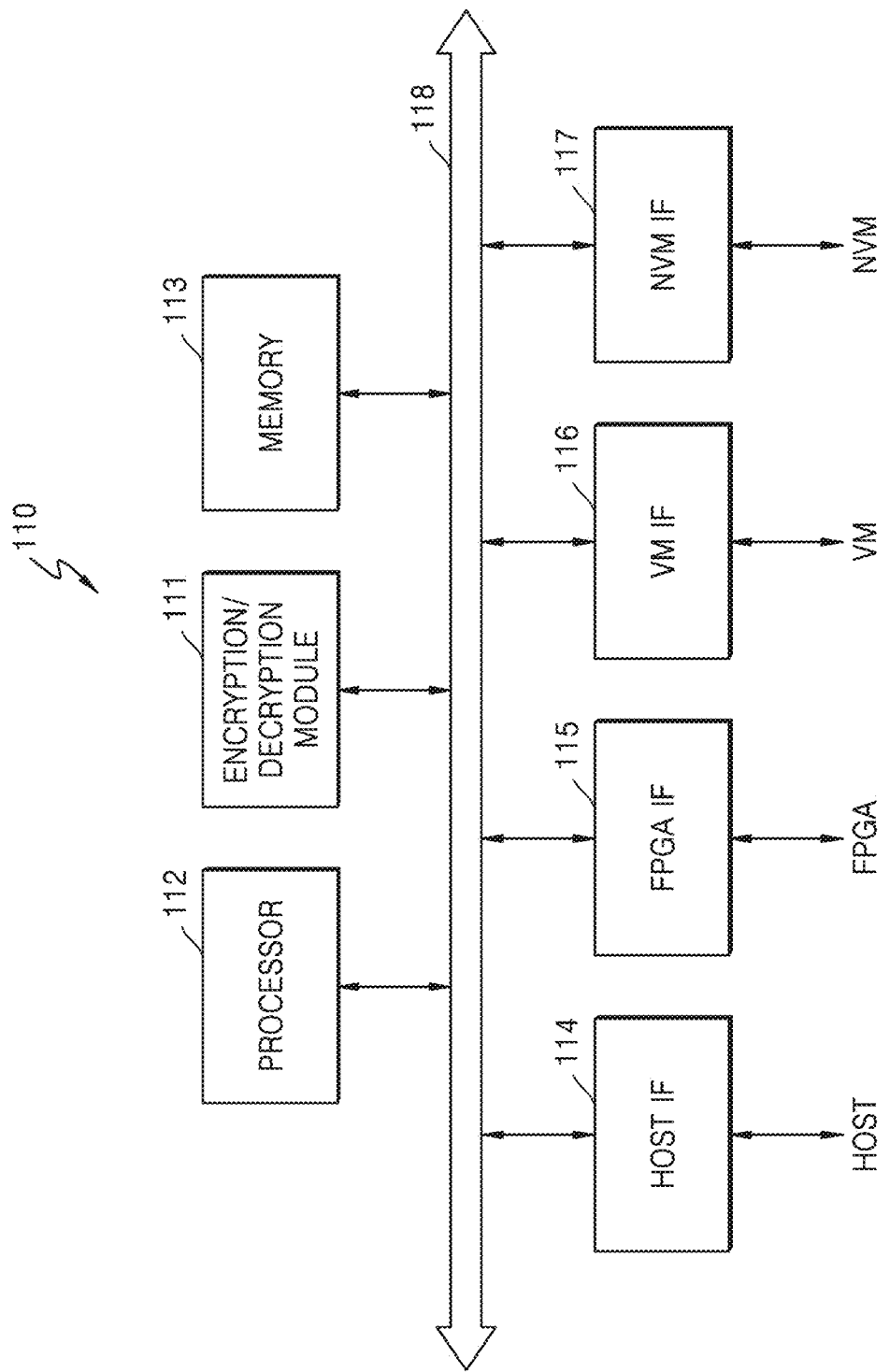
FIG. 10 is a block diagram of the controller of FIG. 2.

FIG. 10 is a block diagram of the controller 110 of FIG. 2.

Referring to FIG. 10, the controller 110 may include the encryption/decryption module 111, a processor 112, a memory 113, a host interface 114, an FPGA interface 115, a volatile memory interface 116, and a non-volatile memory interface 117, and these components may communicate with each other via a bus 118. For example, the reconfigurable logic chip 200 may include a FPGA. In an example embodiment, the encryption/decryption module 111 may be implemented by execution of software or firmware loaded to the memory 113. However, example embodiments of the inventive concepts are not limited thereto, and the encryption/decryption module 111 may be embodied as hardware.

The processor 112 may include a CPU or a microprocessor and may control general operations of the controller 110. In an example embodiment, the processor 112 may be implemented as a multi-core processor, e.g., a dual-core processor or a quad-core processor. The memory 113 may operate by the control of the processor 112, and may be used as an operation memory, a buffer memory, a cache memory, or the like. For example, the memory 113 may be implemented as a volatile memory such as DRAM or SRAM, or a non-volatile memory such as PRAM or a flash memory.

The host interface 114 may provide an interface between the host 300 and the controller 110, and for example, the interface may include the first port PT1 of FIG. 1. The FPGA interface 115 may provide an interface between the controller 110 and an FPGA, i.e., the reconfigurable logic chip 200, and for example, the interface may include the second port PT2 of FIG. 1. In an example embodiment, the FPGA interface 115 may receive encrypted data from the encryption/decryption module 111, and may provide the encrypted data to the reconfigurable logic chip 200. Also, the FPGA interface 115 may receive encrypted data from the reconfigurable logic chip 200, and may provide the encrypted data to the encryption/decryption module 111.

The volatile memory interface 116 may provide an interface between the controller 110 and a volatile memory, e.g., the buffer memory 120 of FIG. 2. In an example embodiment, the volatile memory interface 116 may receive the encrypted data from the encryption/decryption module 111, and may provide the encrypted data to the buffer memory 120. Also, the volatile memory interface 116 may receive encrypted data from the buffer memory 120, and may provide the encrypted data to the encryption/decryption module 111.

The non-volatile memory interface 117 may provide an interface between the controller 110 and the non-volatile memory 130. In an example embodiment, the non-volatile memory interface 117 may receive encrypted data from encryption/decryption module 111, and may provide the encrypted data to the non-volatile memory 130. Also, the non-volatile memory interface 117 may receive encrypted data from the non-volatile memory 130, and may provide the encrypted data to the encryption/decryption module 111. In an example embodiment, the number of the non-volatile memory interfaces 117 may correspond to the number of non-volatile memory chips included in the storage device 100 or the number of channels between the controller 110 and the non-volatile memory 130.

Figure 11:
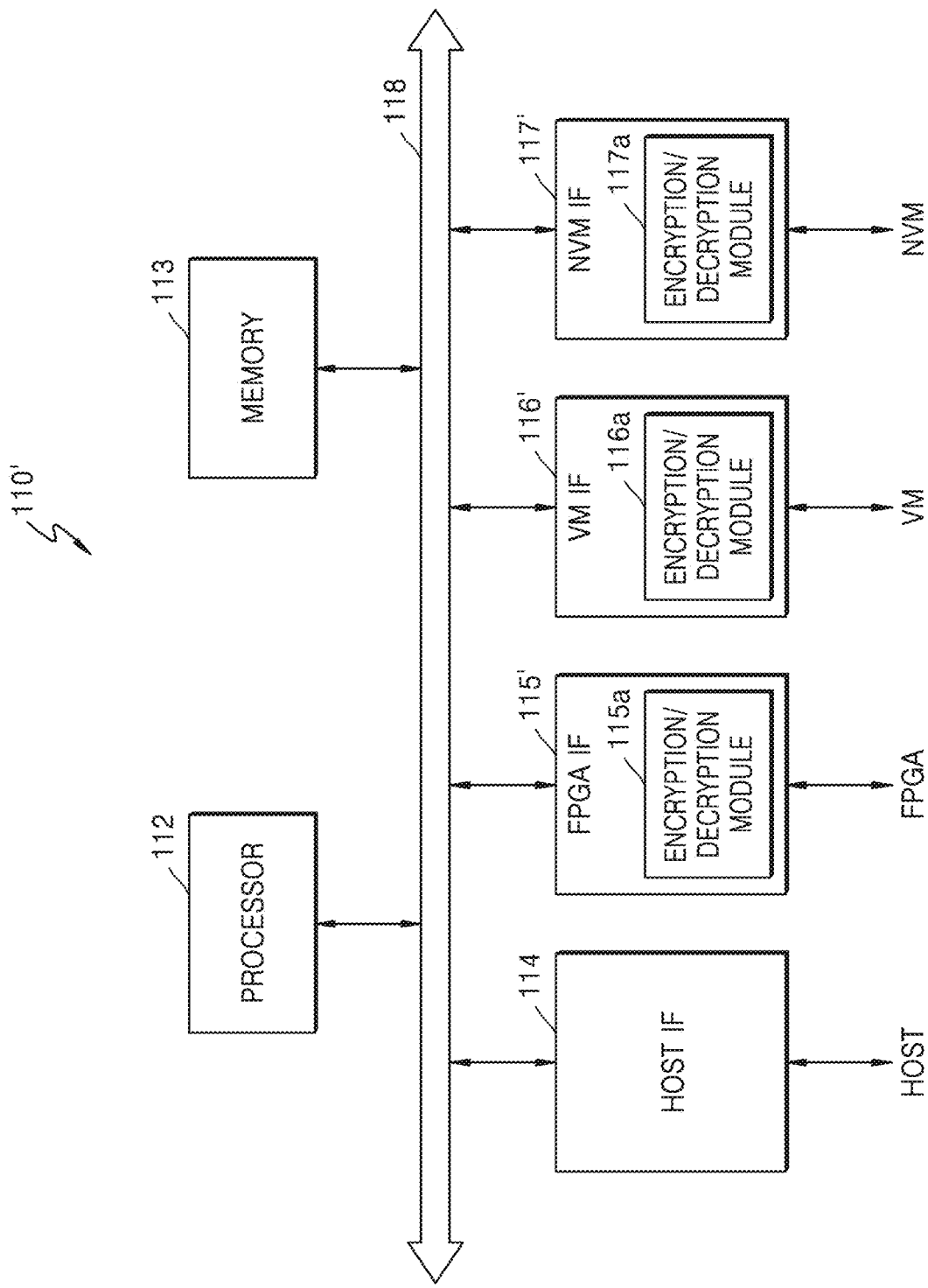
FIG. 11 is a block diagram illustrating a modified example of the controller of FIG. 10.

FIG. 11 is a block diagram illustrating a modified example 110' of the controller 110 of FIG. 10.

Referring to FIG. 11, the controller 110' may include the processor 112, the memory 113, the host interface 114, an FPGA interface 115', a volatile memory interface 116', and a non-volatile memory interface 117', and these components may be connected to each other via the bus 118. Hereinafter, a difference between the controller 110' according to the present example embodiment and the controller 110 of FIG. 10 will now be mainly described.

The FPGA interface 115' may include an encryption/decryption module 115a. The encryption/decryption module 115a may encrypt data received from the memory 113, the host 300, the buffer memory 120, or the non-volatile memory 130, and may provide the encrypted data to the reconfigurable logic chip 200. Also, the encryption/decryption module 115a may receive encrypted data from the reconfigurable logic chip 200, may decrypt the encrypted data, and then may provide the decrypted data to the memory 113, the host 300, the buffer memory 120, or the non-volatile memory 130.

The volatile memory interface 116' may include an encryption/decryption module 116a, and the encryption/decryption module 116a may be selectively activated. In an embodiment, the encryption/decryption module 116a may encrypt data received from the memory 113, the host 300, or the non-volatile memory 130, and may provide the encrypted data to the buffer memory 120. Also, the encryption/decryption module 116a may receive encrypted data from the buffer memory 120, may decrypt the encrypted data, and then may provide the decrypted data to the memory 113, the host 300, or the non-volatile memory 130. In an embodiment, the volatile memory interface 116' may store encrypted data received from the reconfigurable logic chip 200 in the buffer memory 120 without passing through the encryption/decryption module 116a, and may provide the encrypted data received from the buffer memory 120 to the reconfigurable logic chip 200 without passing through the encryption/decryption module 116a.

The non-volatile memory interface 117' may include an encryption/decryption module 117a, and the encryption/decryption module 117a may be selectively activated. In an embodiment, the encryption/decryption module 117a may encrypt data received from the memory 113, the host 300, or the buffer memory 120, and may provide the encrypted data to the non-volatile memory 130. Also, the encryption/decryption module 117a may receive encrypted data from the non-volatile memory 130, may decrypt the encrypted data, and then may provide the decrypted data to the memory 113, the host 300, or the buffer memory 120. In an example embodiment, the non-volatile memory interface 117' may store encrypted data received from the reconfigurable logic chip 200 in the non-volatile memory 130 without passing through the encryption/decryption module 117a, and may provide encrypted data received from the non-volatile memory 130 to the reconfigurable logic chip 200 without passing through the encryption/decryption module 117a.

Figure 12:
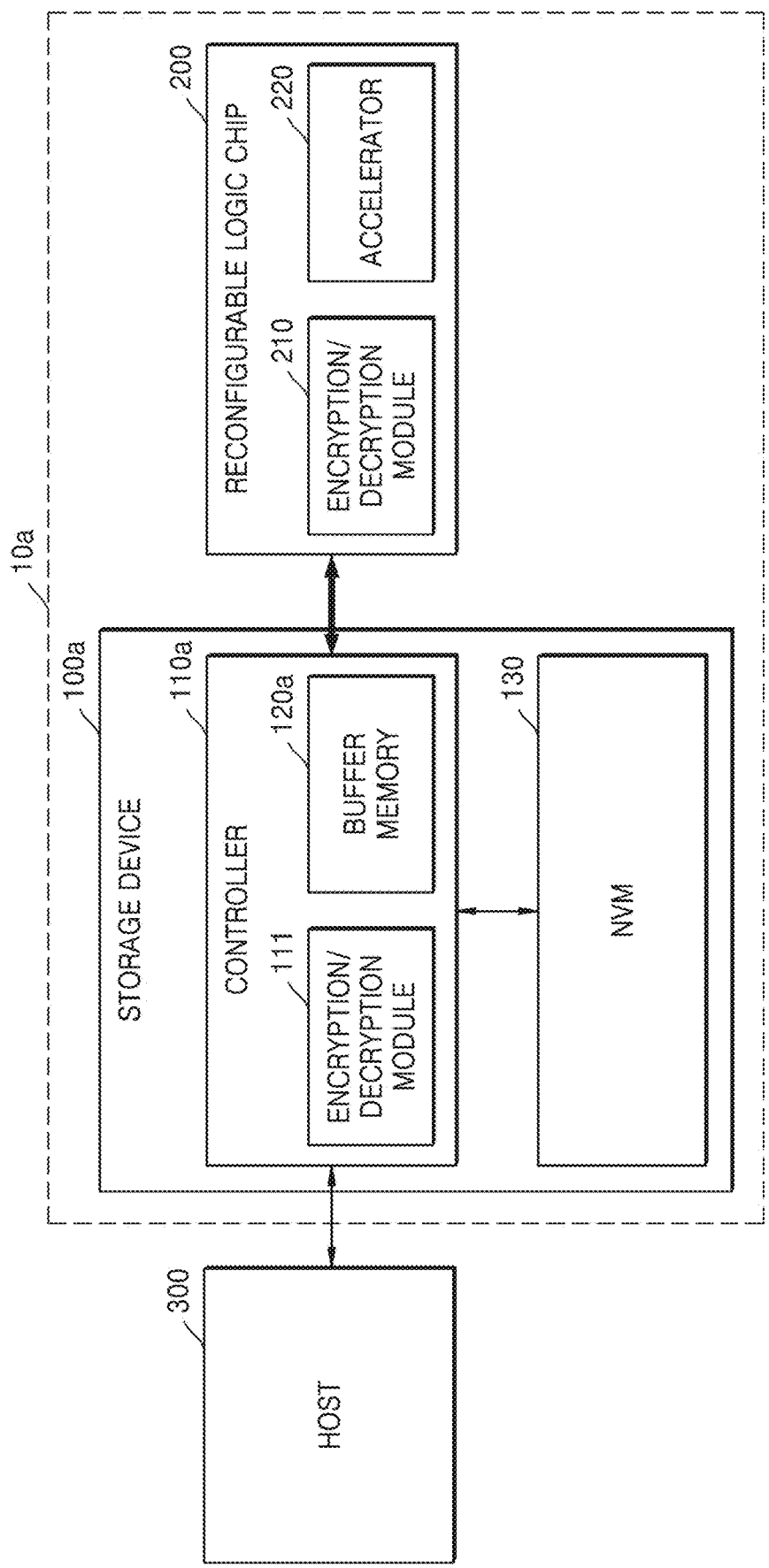
FIG. 12 is a block diagram of a storage device set, according to an example embodiment.

FIG. 12 is a block diagram of a storage device set 10a, according to an example embodiment.

Referring to FIG. 12, a storage device 100a may include a controller 110a and the non-volatile memory 130, and the controller 110a may include the encryption/decryption module 111 and a buffer memory 120a. According to the present example embodiment, the buffer memory 120a may be mounted in the controller 110a. In an example embodiment, the encryption/decryption module 111 may be provided in a front side of the buffer memory 120a. Accordingly, the buffer memory 120a may buffer encrypted data.

The encryption/decryption module 111 may encrypt input data received from the host 300 or the non-volatile memory 130, and may provide the encrypted input data to the buffer memory 120a. Accordingly, the buffer memory 120a may buffer the encrypted input data. Also, the encryption/decryption module 111 may decrypt encrypted output data received from the reconfigurable logic chip 200, and may provide the decrypted output data to the buffer memory 120a. Accordingly, the buffer memory 120a may buffer the decrypted output data. However, example embodiments of the inventive concepts are not limited thereto, and the buffer memory 120a may buffer encrypted output data received from the reconfigurable logic chip 200.

Figure 13:
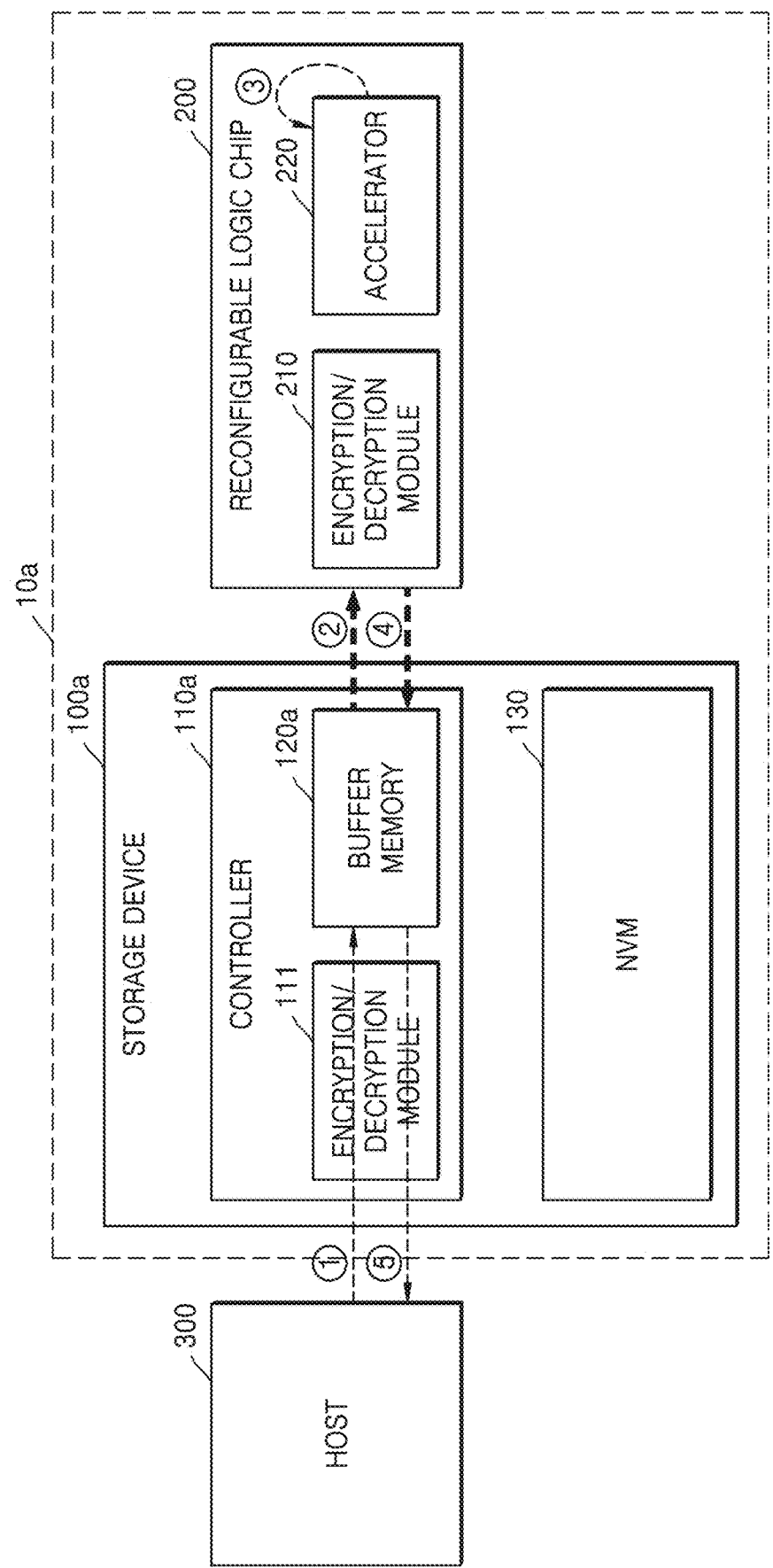
FIG. 13 illustrates an example of operations of the storage device set of FIG. 12.

FIG. 13 illustrates an example of operations of the storage device set 10a of FIG. 12.

Referring to FIG. 13, in a first operation, the host 300 may transmit a host command including a data processing request and data to the storage device 100a, and the encryption/decryption module 111 may encrypt data and may load the encrypted data into the buffer memory 120a. In a second operation, the reconfigurable logic chip 200 may read the encrypted data loaded into the buffer memory 120a, and the encryption/decryption module 210 may decrypt the encrypted data, and may provide the decrypted data to the accelerator 220. In a third operation, the accelerator 220 may generate processed data by processing the decrypted data according to a desired (or, alternatively, a predetermined) configuration. In a fourth operation, the encryption/decryption module 210 may encrypt the processed data, and may write the encrypted processed data to the buffer memory 120a. Afterward, in a fifth operation, the host 300 may read the encrypted processed data from the buffer memory 120a.

Figure 14:
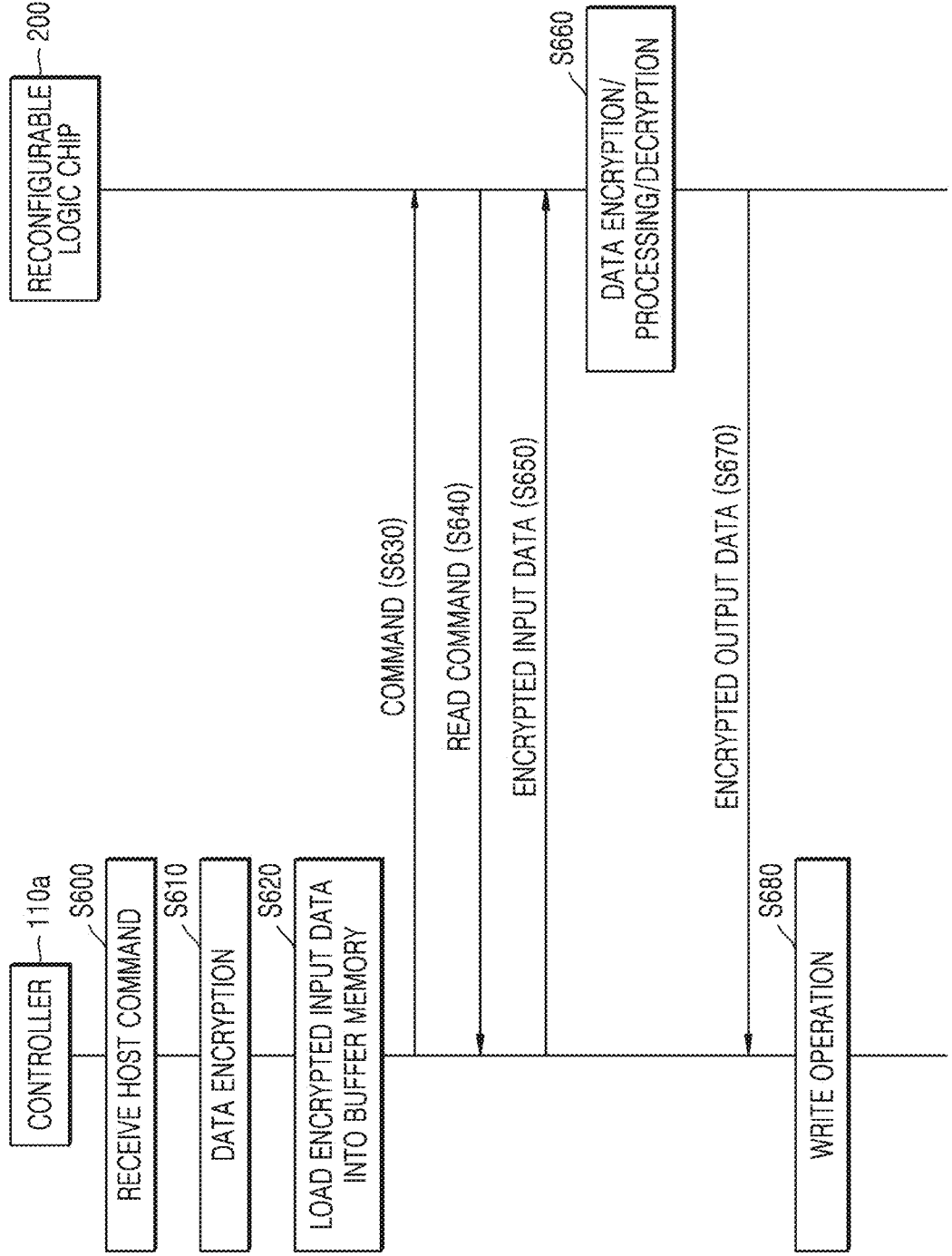
FIG. 14 is a flowchart illustrating an example of operations between a controller and the reconfigurable logic chip of FIG. 13.

FIG. 14 is a flowchart illustrating an example of operations between the controller 110a and the reconfigurable logic chip 200 of FIG. 13.

Referring to FIG. 14, in operation S600, the controller 110a receives a host command including a data processing request and data from the host 300. In operation S610, the encryption/decryption module 111 included in the controller 110a generates encrypted input data by encrypting the received data. In operation S620, the controller 110a loads the encrypted input data into the buffer memory 120a (S620). In operation S630, The controller 110a transmits a command commanding data processing to the reconfigurable logic chip 200.

In operation S640, the reconfigurable logic chip 200 transmits a read command to the controller 110a. In operation S650, the controller 110a transmits the encrypted input data to the reconfigurable logic chip 200.

In operation S660, the reconfigurable logic chip 200 generates decrypted data by decrypting the encrypted input data, generates processed data by processing the decrypted data, and generates encrypted output data by encrypting the processed data. In operation S670, the reconfigurable logic chip 200 transmits the encrypted output data to the controller 110a.

In operation S680, the controller 110a writes the encrypted output data to the buffer memory 120a or the non-volatile memory 130. For example, in an example embodiment, the encryption/decryption module 111 may generate decrypted output data by decrypting the encrypted output data, and the controller 110a may write the decrypted output data to the buffer memory 120a or the non-volatile memory 130. Afterward, the controller 110a may transmit a response message indicating completion of the data processing to the host 300.

Figure 15:
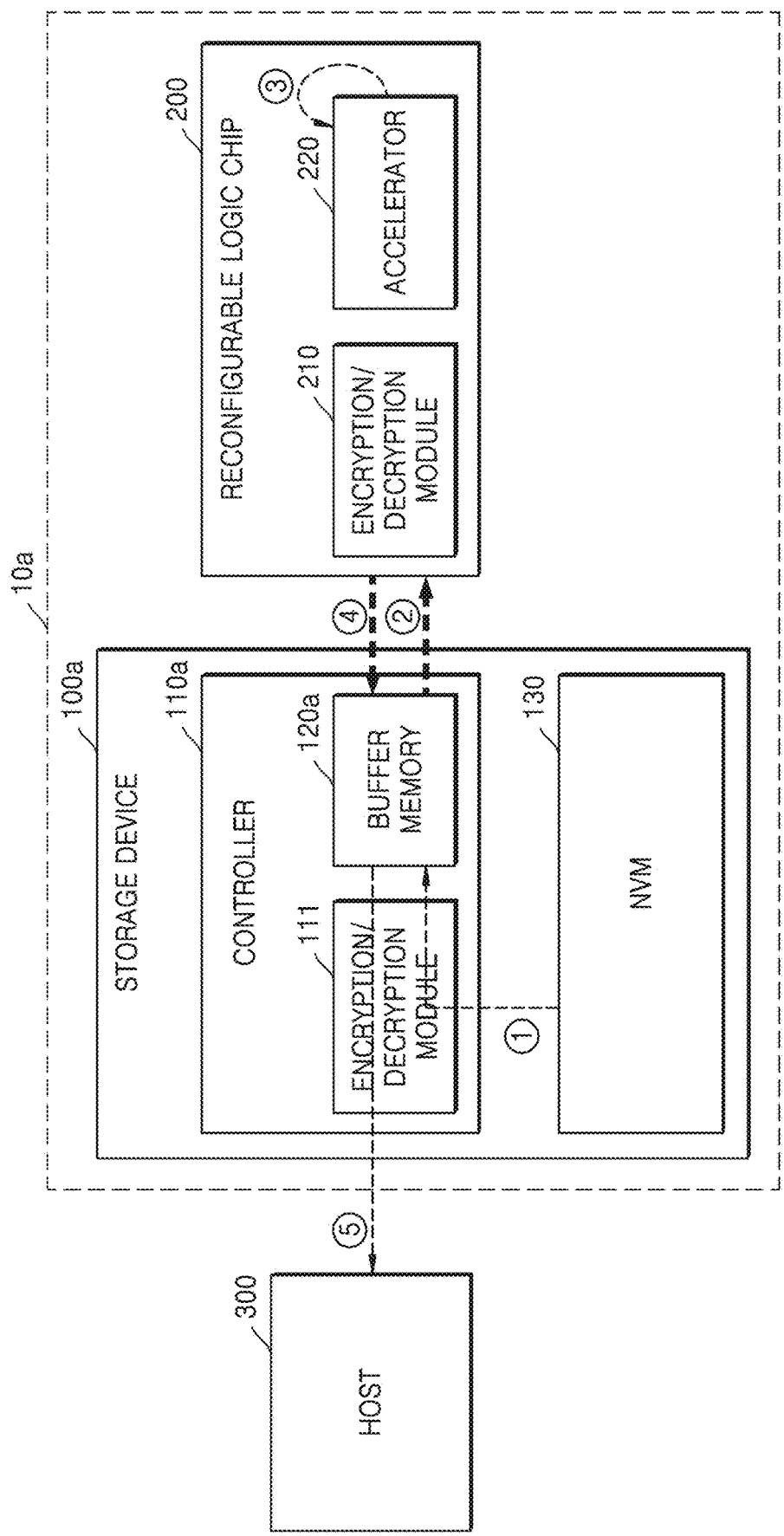
FIG. 15 illustrates another example of operations of the storage device set of FIG. 12.

FIG. 15 illustrates another example of operations of the storage device set 10a of FIG. 12.

Referring to FIG. 15, in a first operation, the host 300 may transmit a host command including a data processing request to the storage device 100a, and in response thereto, the controller 110a may read data stored in the non-volatile memory 130, and may load the read data into the buffer memory 120a. For example, in an example embodiment, the encryption/decryption module 111 may encrypt the read data, and may provide the encrypted data to the buffer memory 120a. In an embodiment, the controller 110a may read encrypted data from the non-volatile memory 130, and may load the read encrypted data into the buffer memory 120a.

A second operation to a fifth operation may be similar to a second to fifth operation discussed with reference to FIG. 13. For example, the reconfigurable logic chip 200 may read the encrypted data loaded into the buffer memory 120a. The encryption/decryption module 210 may decrypt the encrypted data, and may provide decrypted data the accelerator 220. The accelerator 220 may generate processed data by processing the decrypted data according to a predetermined configuration. Then, the encryption/decryption module 210 may encrypt the processed data, and may write the encrypted processed data to the buffer memory 120a. Afterward, the host 300 may read the encrypted processed data from the buffer memory 120*a*.

Figure 16:
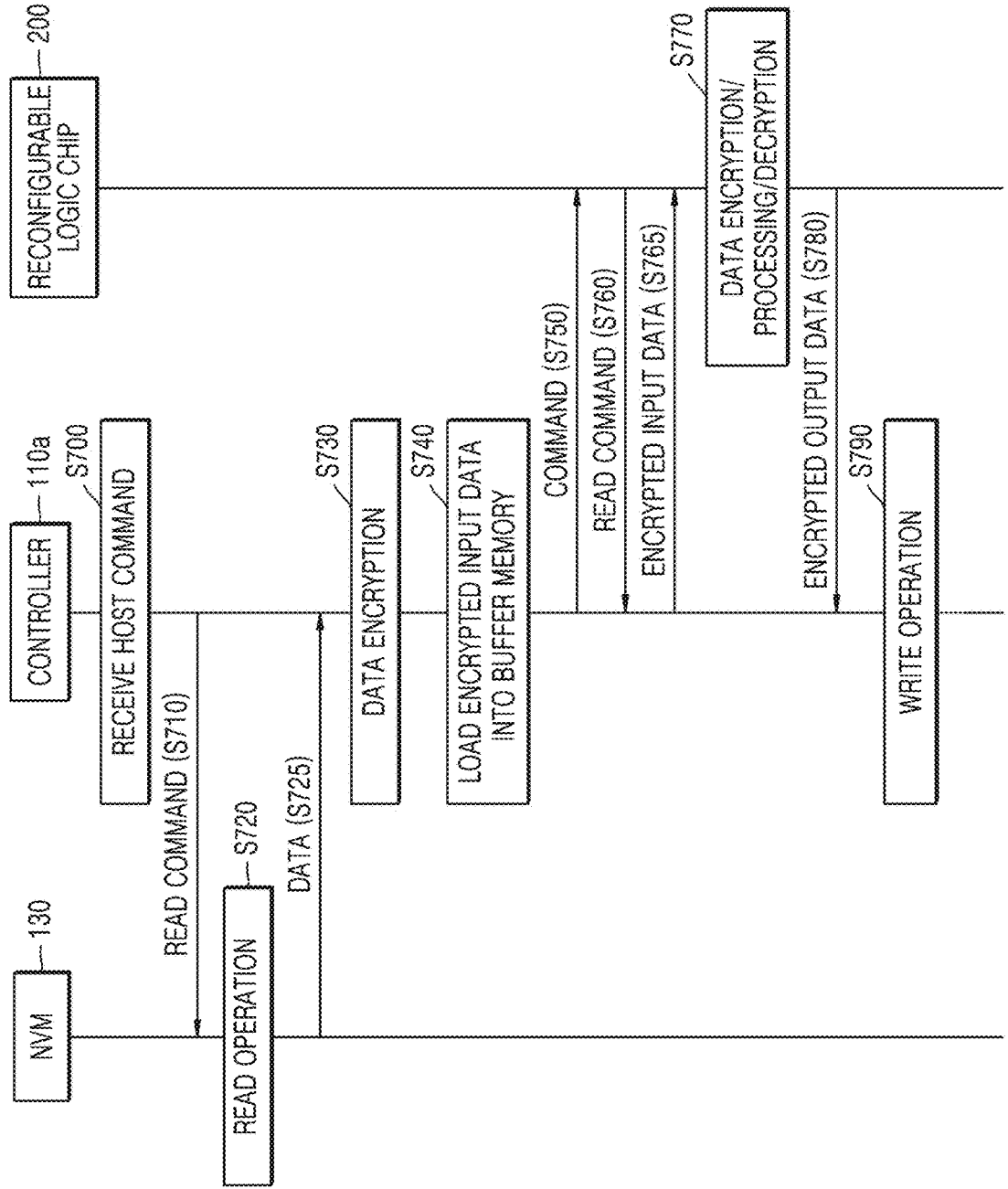
FIG. 16 is a flowchart illustrating an example of operations among the non-volatile memory, the controller, and the reconfigurable logic chip of FIG. 15.

FIG. 16 is a flowchart illustrating an example of operations among the non-volatile memory 130, the controller 110*a*, and the reconfigurable logic chip 200 of FIG. 15.

Referring to FIG. 16, in operation S700, the controller 110*a* receives a host command including a data processing request from the host 300. In operation S710, the controller 110*a* transmits a read command to the non-volatile memory 130. In an example embodiment, the controller 110*a* may refer to a mapping table and check a physical address where processing-target data is stored, and may transmit the read command including the physical address to the non-volatile memory 130. In operation S720, the non-volatile memory 130 performs a read operation (S720), and, in operation S725, transmits data to the controller 110*a*.

Operations S730 to S790 may be similar to operations discussed above with reference to FIG. 14. For example, the encryption/decryption module 111 included in the controller 110*a* generates encrypted input data by encrypting the received data (S730). The controller 110*a* loads the encrypted input data into the buffer memory 120*a* (S740).

The controller 110*a* transmits a command commanding data processing to the reconfigurable logic chip 200 (S750). The reconfigurable logic chip 200 transmits a read command to the controller 110*a* (S760). The controller 110*a* transmits encrypted input data to the reconfigurable logic chip 200 (S765). The reconfigurable logic chip 200 generates decrypted data by decrypting the encrypted input data, generates processed data by processing the decrypted data, and generates encrypted output data by encrypting the processed data (S770). The reconfigurable logic chip 200 transmits the encrypted output data to the controller 110*a* (S780).

The controller 110*a* writes the encrypted output data to the buffer memory 120*a* or the non-volatile memory 130 (S790). In an embodiment, the encryption/decryption module 111 may generate decrypted output data by decrypting the encrypted output data, and the controller 110*a* may write the decrypted output data to the buffer memory 120*a* or the non-volatile memory 130. Afterward, the controller 110*a* may transmit a response message indicating completion of the data processing to the host 300.

Figure 17:
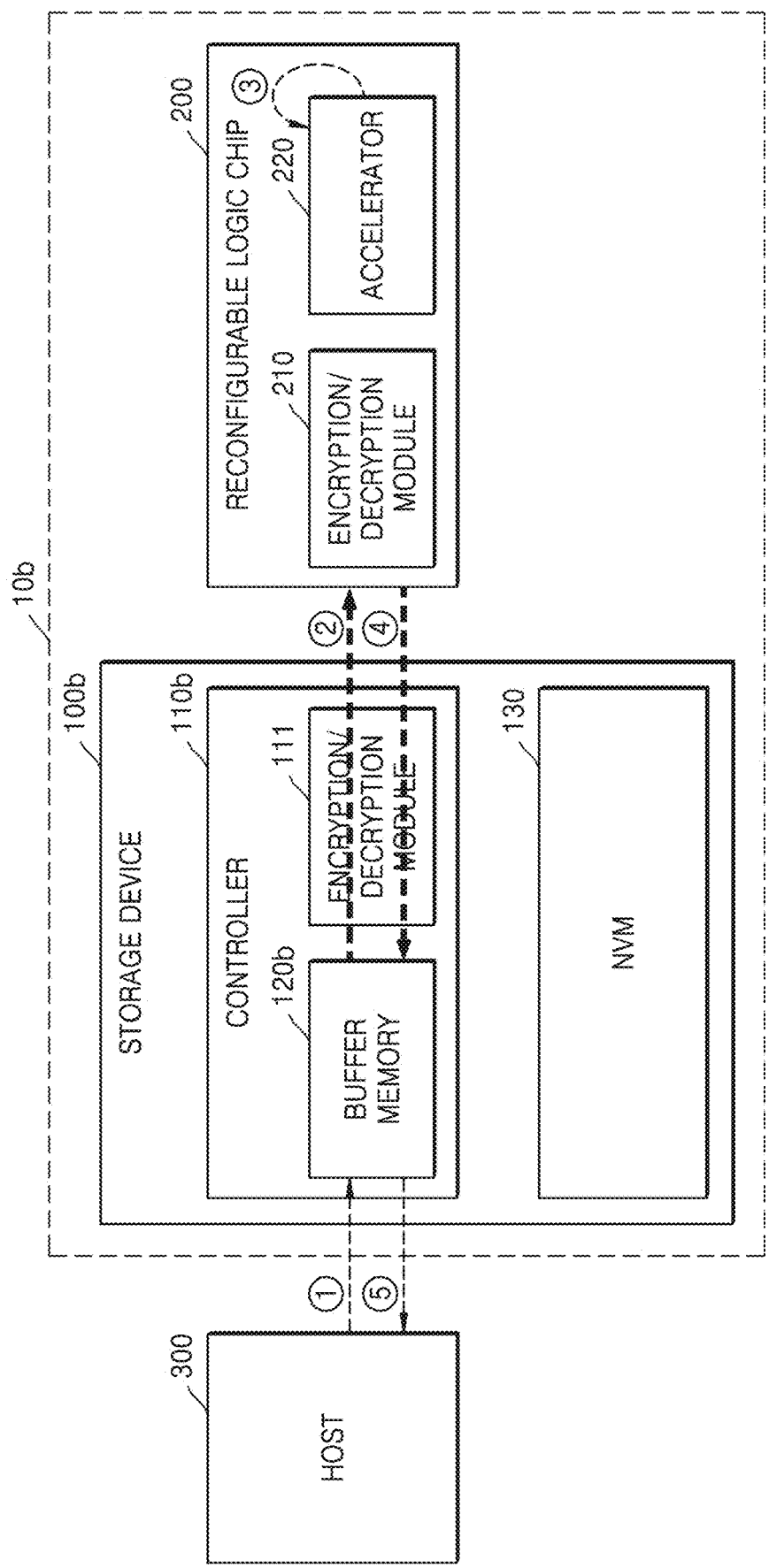
FIG. 17 illustrates an example of operations of a storage device set, according to an example embodiment.

FIG. 17 illustrates an example of operations of a storage device set 10*b*, according to an example embodiment.

Referring to FIG. 17, a storage device 100 may include a controller 110*b* and the non-volatile memory 130, and the controller 110*b* may include the encryption/decryption module 111 and a buffer memory 120*b*. According to the present embodiment, the buffer memory 120*b* may be mounted in the controller 110*b*. In an example embodiment, the encryption/decryption module 111 may be provided in a rear side of the buffer memory 120*b*. Accordingly, the buffer memory 120*b* may buffer normal data that is not encrypted.

In a first operation, the host 300 may transmit a host command including a data processing request and data to the storage device 100*b*, and the data received from the host 300 may be loaded into the buffer memory 120*b*. In a second operation, the encryption/decryption module 111 may encrypt data loaded into the buffer memory 120*b*, and may provide the encrypted data to the reconfigurable logic chip 200.

In a third operation, the encryption/decryption module 210 may decrypt the encrypted data and provide the decrypted data to the accelerator 220, and the accelerator 220 may generate processed decrypted data by processing the data according to a desired (or, alternatively, a prede-termined) configuration. Then, in a fourth operation, the encryption/decryption module 210 may encrypt the processed data, and provide the encrypted processed data to the controller 110*b*. The encryption/decryption module 111 may decrypt the encrypted processed data, and may load the decrypted processed data into the buffer memory 120*b*. Afterward, in a fifth operation, the host 300 may read the decrypted processed data from the buffer memory 120*b*.

Figure 18:
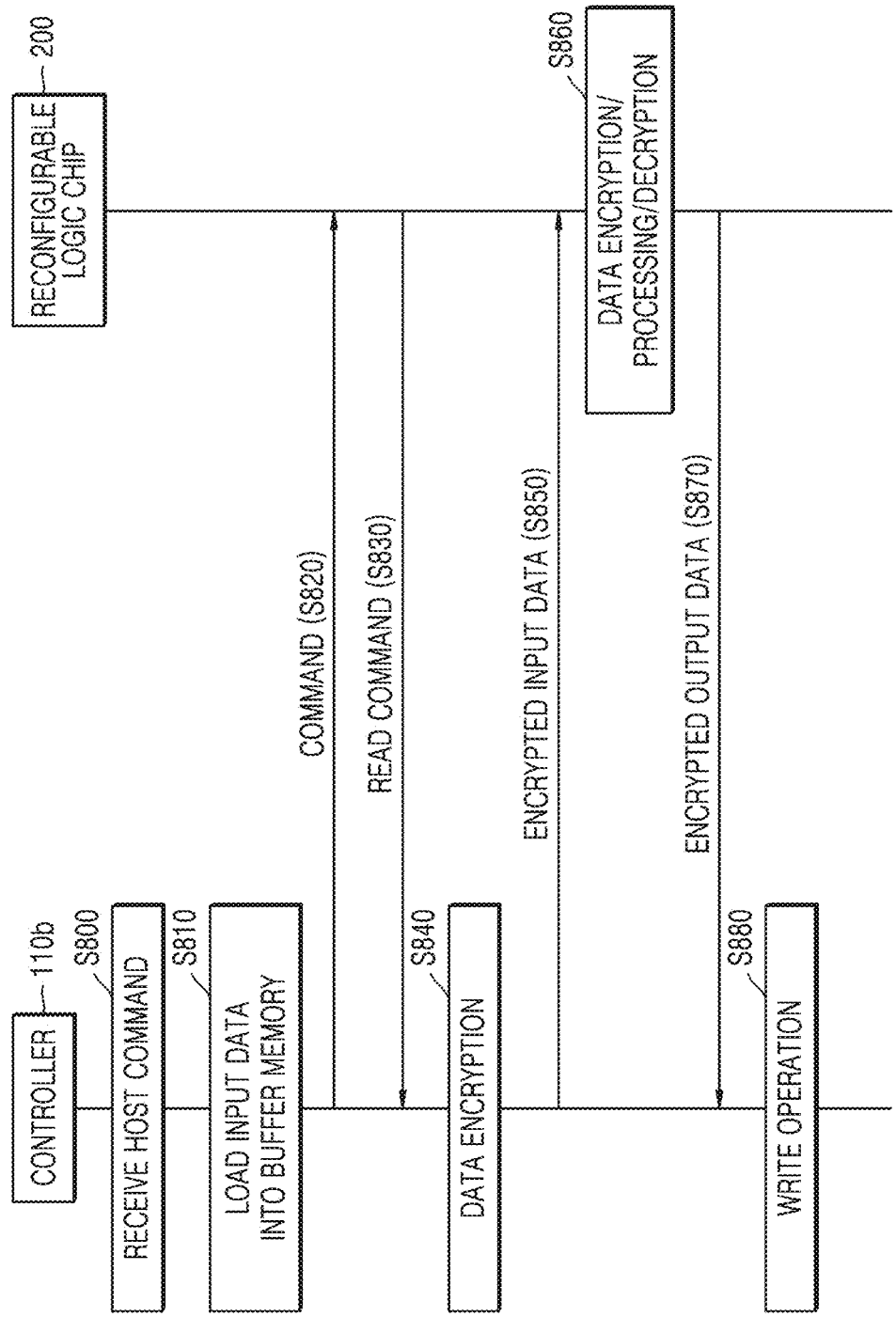
FIG. 18 is a flowchart illustrating an example of operations between the controller and the reconfigurable logic chip of FIG. 17.

FIG. 18 is a flowchart illustrating an example of operations between the controller 110*b* and the reconfigurable logic chip 200 of FIG. 17.

Referring to FIG. 18, in operation S800, the controller 110*b* receives a host command including a data processing request and data from the host 300. In operation S810, the controller 110*b* loads the received data into the buffer memory 120*b*. In operation S820, the controller 110*b* transmits a command commanding data processing to the reconfigurable logic chip 200. In operation 58230, the reconfigurable logic chip 200 transmits a read command to the controller 110*b*.

In operation S840, the encryption/decryption module 111 included in the controller 110*b* generates encrypted input data by encrypting the data loaded into the buffer memory 120*b*.

Once the encrypted data is generated, in operation S850, the controller 110*b* transmits the encrypted input data to the reconfigurable logic chip 200. In operation S860, the reconfigurable logic chip 200 generates decrypted data by decrypting the encrypted input data, generates processed data by processing the decrypted data, and generates encrypted output data by encrypting the processed data. In operation S870, the reconfigurable logic chip 200 transmits the encrypted output data to the controller 110*b*.

In operation S880, the controller 110*b* writes the encrypted output data to the buffer memory 120*b* or the non-volatile memory 130. For example, when the encryption/decryption module 111 is on the rear side of the buffer memory 120*b* as illustrated in FIG. 17, in an example embodiment, the encryption/decryption module 111 may generate decrypted output data by decrypting the encrypted output data, and the controller 110*b* may write the decrypted output data to the buffer memory 120*b* or the non-volatile memory 130. Afterward, the controller 110*b* may transmit a response message indicating completion of the data processing to the host 300.

Figure 19:
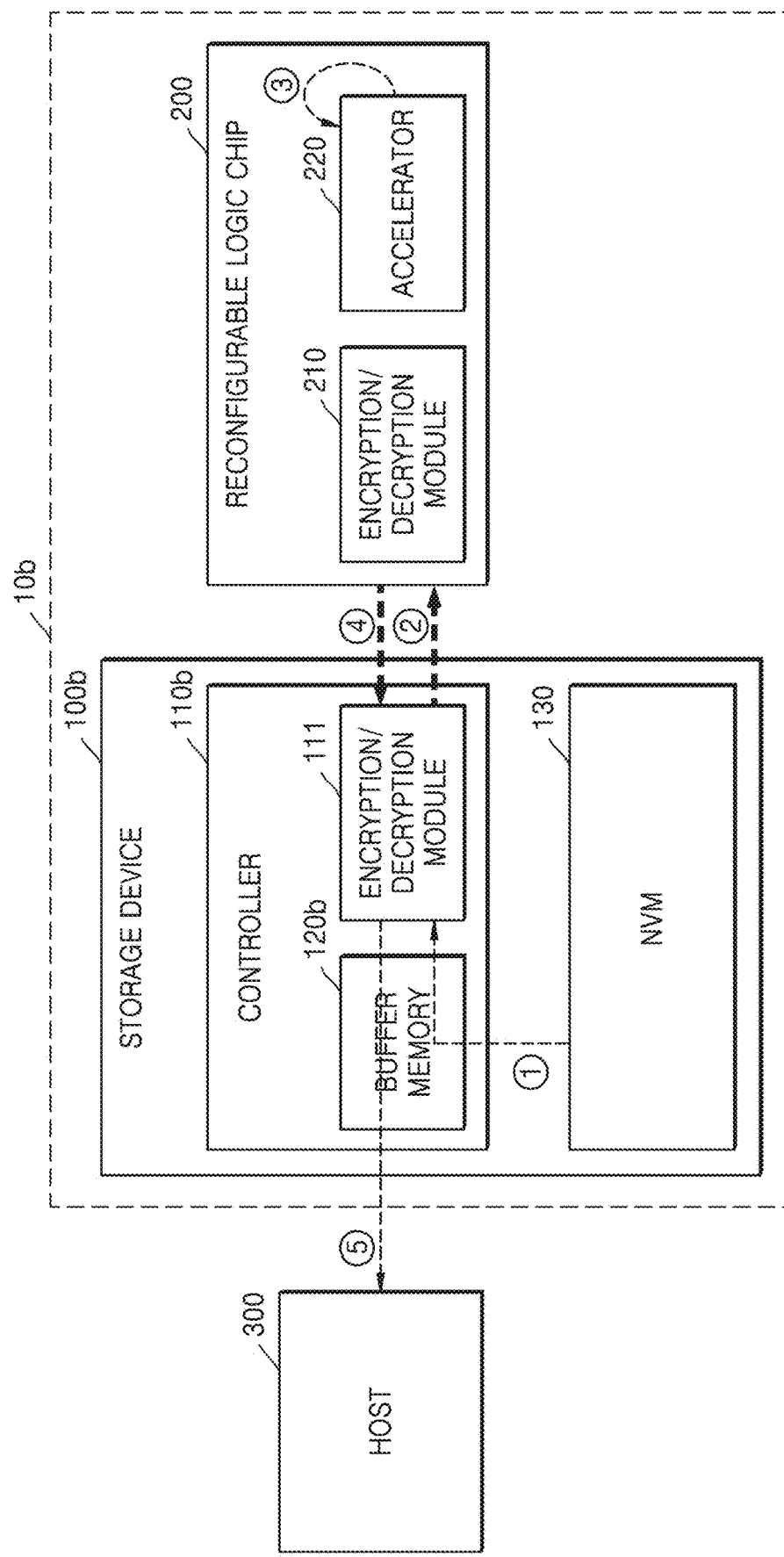
FIG. 19 illustrates another example of operations of the storage device set according to the example embodiment.

FIG. 19 illustrates another example of operations of the storage device set 10*b* according to an example embodiment.

Referring to FIG. 19, in a first operation, the host 300 may transmit a host command including a data processing request to the storage device 100*b*, and, in response thereto, the controller 110*b* may read data stored in the non-volatile memory 130 and may load the read data into the buffer memory 120*b*. In a second operation, the encryption/decryption module 111 may encrypt the data loaded into the buffer memory 120*b*, and may provide the encrypted data to the reconfigurable logic chip 200.

In a third operation, the encryption/decryption module 210 may decrypt the encrypted data and provide the decrypted data to the accelerator 220, and the accelerator 220 may generate processed data by processing the decrypted data according to a desired (or, alternatively, a predetermined) configuration. In a fourth operation, the encryption/decryption module 210 may encrypt the processed data, and may provide the encrypted processed data to the controller 110*b*. In a fifth operation, the encryption/decryption module 111 may decrypt the encrypted processed data, and may load the decrypted processed data into the buffer memory 120b. Afterward, the host 300 may read the decrypted processed data from the buffer memory 120b.

Figure 20:
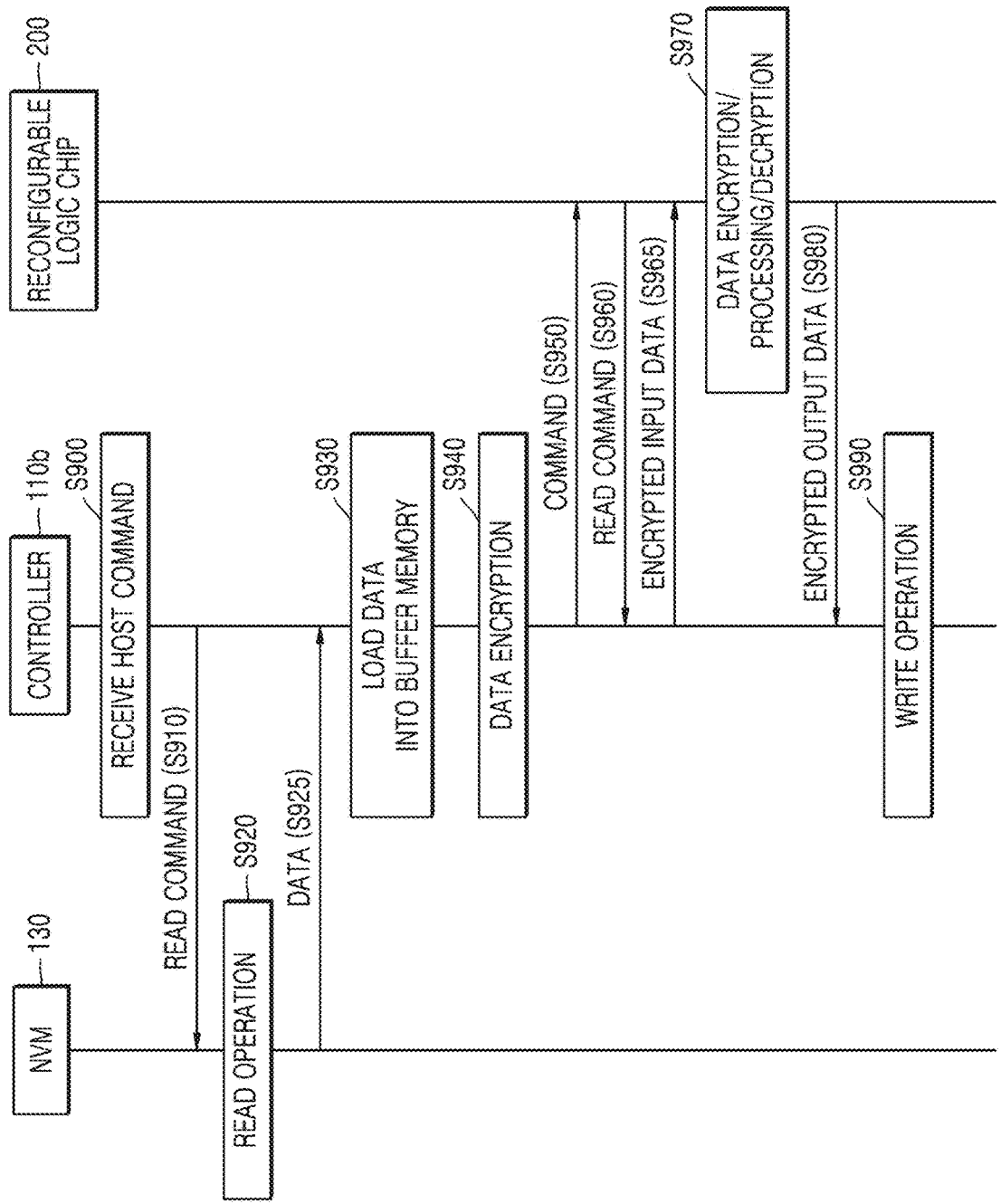
FIG. 20 is a flowchart illustrating an example of operations among the non-volatile memory, the controller, and the reconfigurable logic chip of FIG. 19.

FIG. 20 is a flowchart illustrating an example of operations among the non-volatile memory 130, the controller 110b, and the reconfigurable logic chip 200 of FIG. 19.

Referring to FIG. 20, in operation S900, the controller 110b receives a host command including a data processing request from the host 300. In operation S910, the controller 110b transmits a read command to the non-volatile memory 130. In an example embodiment, the controller 110b may refer to a mapping table and check a physical address where processing-target data is stored, and may transmit the read command including the physical address to the non-volatile memory 130. In operation S920, the non-volatile memory 130 performs a read operation, and, in operation S925, transmits data to the controller 110b.

In operation S930, the controller 110b loads the data into the buffer memory 120b. In operation S940, the encryption/decryption module 111 generates encrypted input data by encrypting the data loaded into the buffer memory 120b.

In operation S950, the controller 110b transmits a command commanding data processing to the reconfigurable logic chip 200. In operation S960, the reconfigurable logic chip 200 transmits a read command to the controller 110b. In operation S965, the controller 110b transmits the encrypted input data to the reconfigurable logic chip 200. In operation S970, the reconfigurable logic chip 200 generates decrypted data by decrypting the encrypted input data, generates processed data by processing the decrypted data, and generates encrypted output data by encrypting the processed data. In operation S980, the reconfigurable logic chip 200 transmits the encrypted output data to the controller 110b.

In operation S990, the controller 110b writes the encrypted output data to the buffer memory 120b or the non-volatile memory 130. For example, when the encryption/decryption module 111 is on the rear side of the buffer memory 120b as illustrated in FIG. 17, in an example embodiment, the encryption/decryption module 111 may generate decrypted output data by decrypting the encrypted output data, and the controller 110b may write the decrypted output data to the buffer memory 120b or the non-volatile memory 130. Afterward, the controller 110b may transmit a response message indicating completion of the data processing to the host 300.

Figure 21:
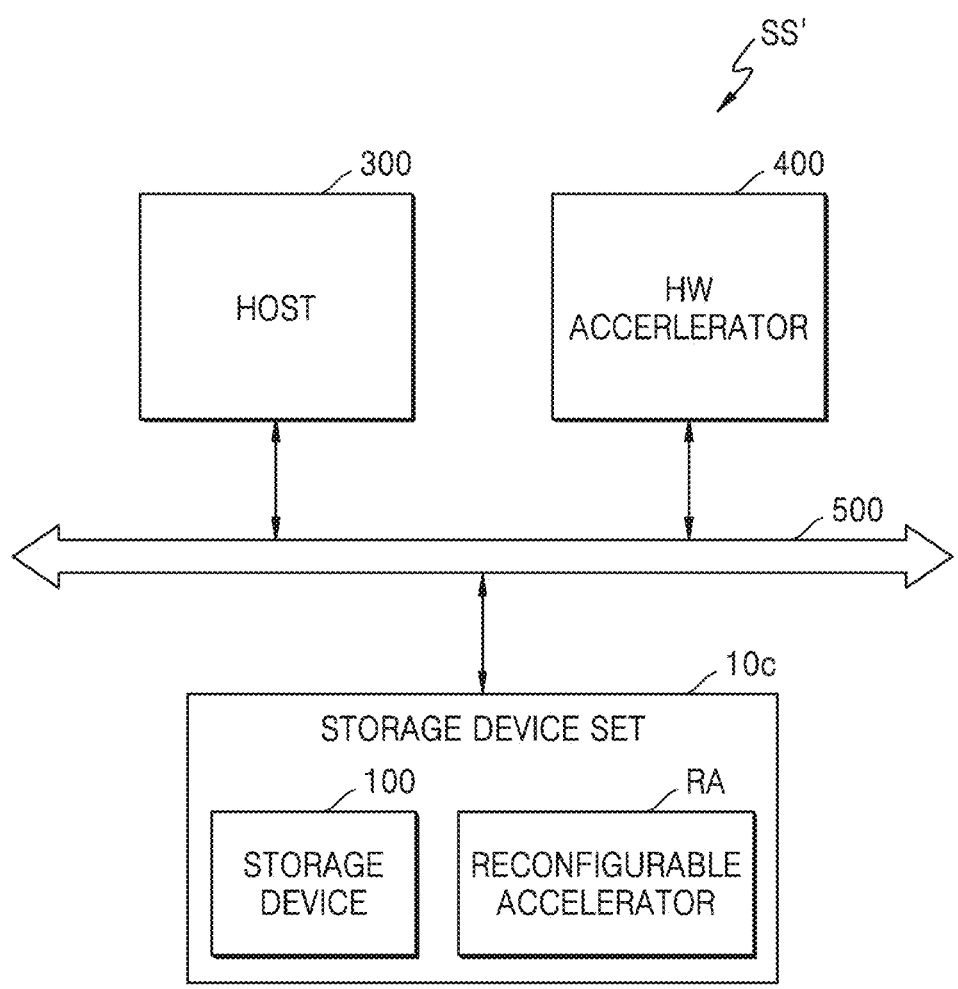
FIG. 21 illustrates a storage system, according to an example embodiment.

FIG. 21 illustrates a storage system SS', according to an example embodiment.

Referring to FIG. 21, the storage system SS' may include a storage device set 10c, the host 300, and a hardware accelerator 400, and these components may communicate with each other via a bus 500. For example, the storage system SS' may be a server or a data center. The storage device set 10c may include the storage device 100 and a reconfigurable accelerator RA. In this manner, the storage system SS' may include both the hardware accelerator 400 and the reconfigurable accelerator RA. The reconfigurable accelerator RA may be implemented in the storage device set 10c.

The hardware accelerator 400 may assist calculation of the host 300 by performing some desired (or, alternatively, predetermined) calculations among calculations performed by the host 300. For example, the hardware accelerator 400 may be a graphics processing unit (GPU). The reconfigurable accelerator RA may be reconfigured in real time according to a type of a calculation performed by the host 300 and then may perform a calculation corresponding to an application that is being currently executed by the host 300. In this manner, a calculation performed by the hardware accelerator 400 is not changed while the storage system SS' operates, whereas a calculation performed by the reconfigurable accelerator RA may be changed while the storage system SS' operates.

According to the present embodiment, the storage device 100 may perform a function of a storage device by including a storage such as a non-volatile memory chip, and further, the storage device 100 and the reconfigurable accelerator RA may configure the storage device set 10c. Accordingly, even if the host 300 and the reconfigurable accelerator RA are not directly connected to each other, the host 300 and the reconfigurable accelerator RA may exchange data via a buffer memory, e.g., a control memory buffer (CMB), included in the storage device 100. By doing so, data processing speed between the storage device 100 and the reconfigurable accelerator RA may be further improved.

Figure 22:
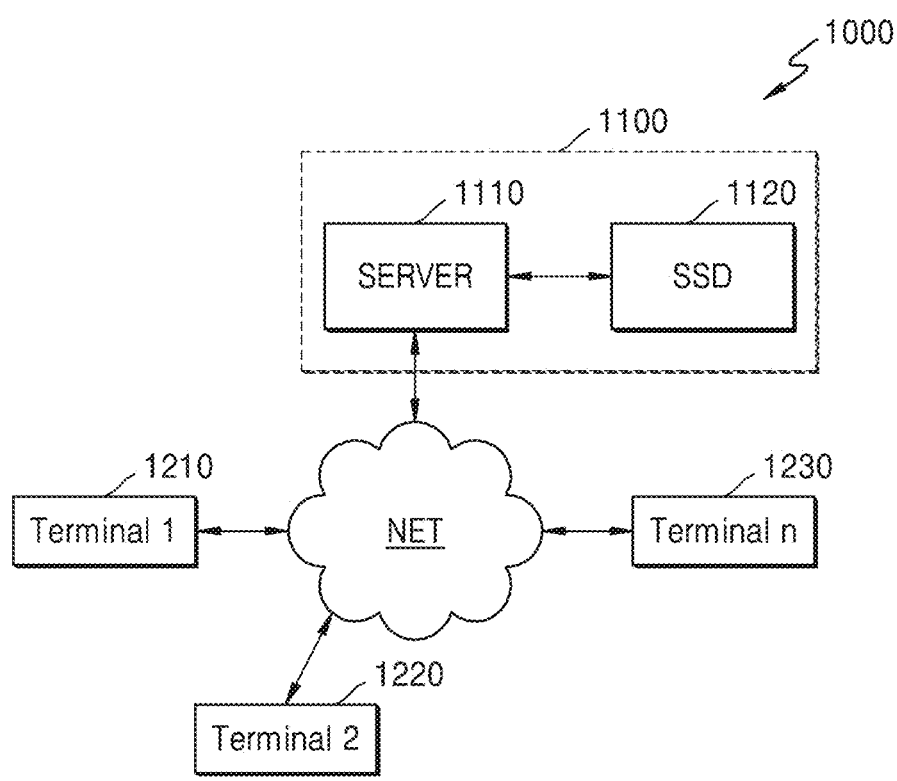
FIG. 22 illustrates a network system, according to an example embodiment.

FIG. 22 illustrates a network system 1000, according to an example embodiment.

Referring to FIG. 22, the network system 1000 may include a server system 1100, and a plurality of terminals 1210 to 1230 configured to communicate with the server system 1100 via a network NET. The server system 1100 may include a server 1110 and an SSD 1120. In this regard, the SSD 1120 may correspond to the storage device 100, 100a, or 100b of the aforementioned example embodiments. In some example embodiments, the SSD 1120 may be embodied by using the example embodiments described with reference to FIGS. 1 to 21.

Figure 23:
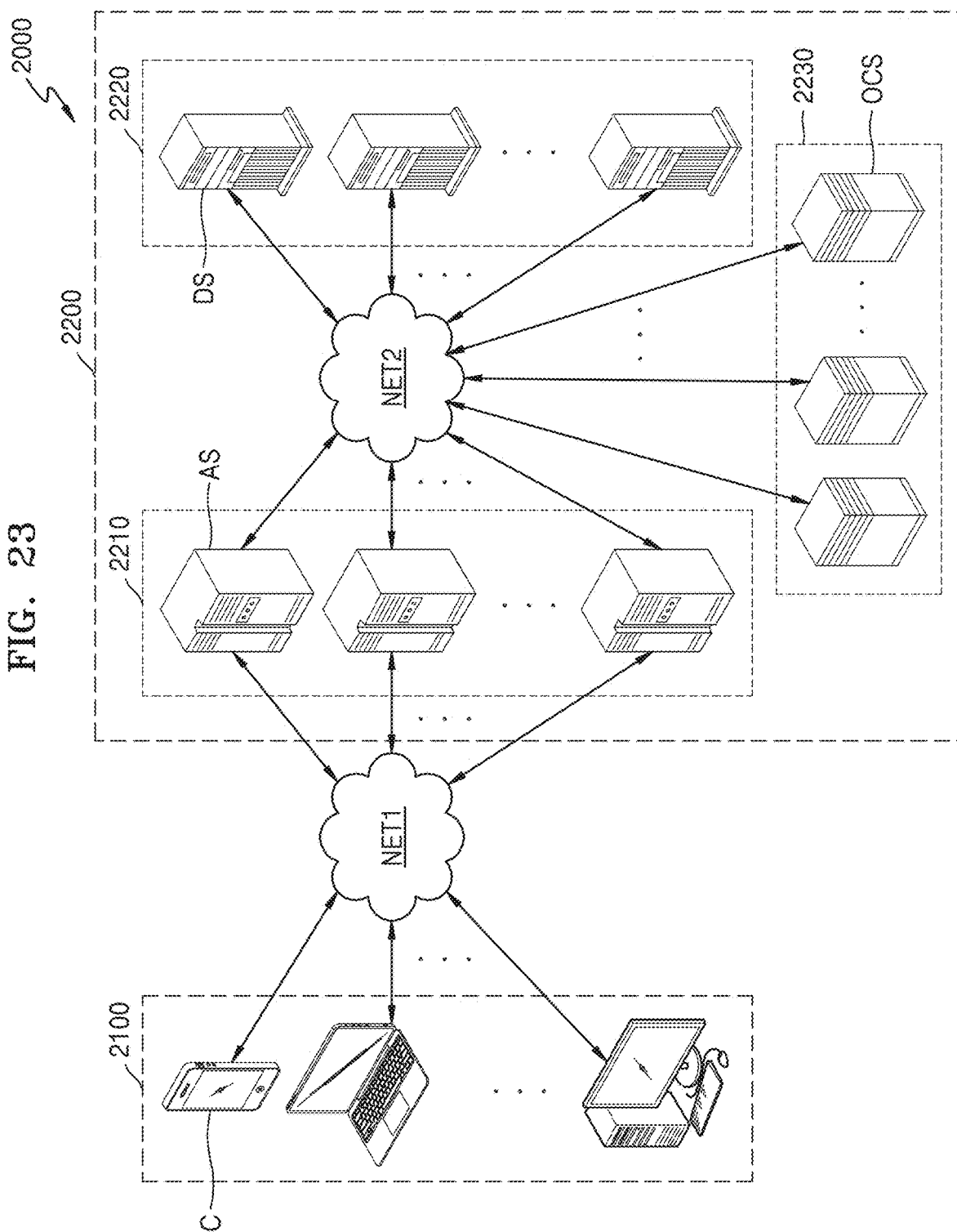
FIG. 23 illustrates a network system, according to an example embodiment.

FIG. 23 illustrates a network system 2000, according to an example embodiment.

Referring to FIG. 23, the network system 2000 may include a client group 2100 and a data center 2200. The client group 2100 may include client devices C configured to communicate with the data center 2200 via a first network NET1, e.g., internet. The data center 2200 may refer to a facility to collect various types of data and provide a service, and may include an application server group 2210, a database server group 2220, and an object cache server group 2230 that communicate with each other via a second network NET2, e.g., a local area network (LAN) or an intranet.

The application server group 2210 may include application server devices AS. The application server devices AS may process a request received from the client group 2100, and may access the database server group 2220 or the object cache server group 2230, in response to the request from the client group 2100. The database server group 2220 may include database server devices DS configured to store data processed by the application server devices AS. The object cache server group 2230 may include object cache server devices OCS configured to temporarily store data stored in the database server devices DS or data read from the database server devices DS, and thus may function as a cache between the application server devices AS and the database server devices DS. In an example embodiment, the database server devices DS may be embodied by using the embodiments described with reference to FIGS. 1 to 21.

According to one or more example embodiments, the units and/or devices described above, may be implemented using hardware, a combination of hardware and software, or a non-transitory storage medium storing software that is executable to perform the functions of the same.

For example, the host 300 and the controller 110 of the storage device 100 may be implemented with using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Further, as discussed above, the reconfigurable logic chip 200 may be implemented with a field-programmable gate array (FPGA) chip, a programmable logic device (PLD) or a complex PLD (CPLD) such that where the reconfigurable logic chip 200 may be reconfigured on the fly from offloading a first operation to offloading a second operation and may exchange data with a host 300 via a buffer memory 120 included in the storage device 100 to reduce overhead of the host 300.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be illustrated as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

While example embodiments of the inventive concepts have been particularly shown and described with reference to some example embodiments thereof, it will be understood by those of ordinary skill in the art that various changes in form and details may be made therein without departing from the spirit and scope of example embodiments of the inventive concepts as defined by the appended claims. The illustrated example embodiments should be considered in descriptive sense only and not for purposes of limitation. Therefore, the scope of example embodiments of the inventive concepts are defined not by the detailed description of example embodiments of the inventive concepts but by the appended claims, and all differences within the scope will be construed as being included in example embodiments of the inventive concepts.

What is claimed is:

1. A storage set, comprising:
 a reconfigurable logic chip including a first encryptor/decryptor; and
 a storage including a first port and a second port, the first port configured to communicate according to a first interface protocol, and the second port configured to communicate according to a second interface protocol, the storage configured to,
  communicate with a host via the first port by receiving non-encrypted input data from the host via the first port,
  store the non-encrypted input data received from the host via the first port,
  generate encrypted input data by encrypting the stored non-encrypted input data, communicate with the reconfigurable logic chip via the second port such that the reconfigurable logic chip and the host only is indirectly communicate by storing data in and reading data from the storage, the storage configured to communicate with the reconfigurable logic chip by transmitting the encrypted input data to the reconfigurable logic chip via the second port, and receiving encrypted output data from the reconfigurable logic chip via the second port, store the encrypted output data received from the reconfigurable logic chip via the second port, and wherein the reconfigurable logic chip is configured to be reconfigured from a first accelerator to a second accelerator.

2. The storage set of claim 1, wherein the reconfigurable logic chip is configured to change from the first accelerator to the second accelerator during an operation of the storage.

3. The storage set of claim 2, wherein the reconfigurable logic chip is further configured to be reconfigured from offloading a first operation to offloading a second operation.

4. The storage set of claim 2, wherein the first accelerator is configured to perform a machine learning algorithm.

5. The storage set of claim 4, wherein the machine learning algorithm includes at least one of a recurrent neural network (RNN) and a convolutional neural network (CNN) for image recognition.

6. The storage set of claim 5, wherein the storage is further configured to receive a host command from the host via the first port, the host command commanding at least one of the CNN and the RNN by the reconfigurable logic chip.

7. The storage set of claim 2, wherein the second accelerator is configured to perform multimedia transcoding or erasure coding.

8. The storage set of claim 7, wherein the reconfigurable logic chip is further configured to generate a first multimedia file having a first format by performing transcoding on a multimedia file having a scalable format, and wherein the first encryptor/decryptor is configured to generate an encrypted first multimedia file by encrypting the first multimedia file.

9. The storage set of claim 1, wherein the reconfigurable logic chip further is configured to perform at least one of inline processing, pre-processing, pre-filtering, cryptography, compression, and protocol bridging.

10. The storage set of claim 1, wherein the reconfigurable logic chip further is configured to perform at least one of a sorting calculation, a searching calculation, a logic calculation, and one or more of four fundamental arithmetic calculations.

11. The storage set of claim 1, wherein the first encryptor/decryptor is configured to decrypt the encrypted input data, and to encrypt output data.

12. The storage set of claim 11, wherein the reconfigurable logic chip is further configured to generate processed data by processing the encrypted input data according to a configuration, and wherein the first encryptor/decryptor is further configured to encrypt processed data to generate the encrypted output data.

13. The storage set of claim 1, wherein the storage further includes non-volatile memory.

14. The storage set of claim 1, wherein the storage further includes a second encryptor/decryptor configured to encrypt the non-encrypted input data received from the host and to decrypt the encrypted output data received from the reconfigurable logic chip to generate decrypted output data.

15. The storage set of claim 14, wherein the storage is further configured to transmit the decrypted output data to the host via the first port.

16. The storage set of claim 1, wherein the storage is further configured to receive the non-encrypted input data and a host command from the host via the first port, the host command including a data processing request.

17. The storage set of claim 1, wherein the storage is further configured to transmit a command commanding the reconfigurable logic chip to process the encrypted input data.

18. The storage set of claim 1, wherein the storage and the reconfigurable logic chip are mounted on a board, or embodied as a package-on-package (PoP).

19. The storage set of claim 1, wherein the reconfigurable logic chip includes a field-programmable gate array (FPGA) chip.

20. A method of operating a storage configured to communicate with a host via a first port and to communicate with a reconfigurable logic chip via a second port, the method comprising:

communicating with a host via the first port, the communicating with the host via the first port including,
receiving non-encrypted input data from the host via the first port, and
receiving, via the first port of the storage, a host command from the host, the host command including a data processing request;

storing the non-encrypted input data provided from the host via the first port;

generating encrypted input data by encrypting the stored non-encrypted input data; and communicating with the reconfigurable logic chip via the second port such that the reconfigurable logic chip and the host only indirectly communicate by storing data in and reading data from the storage, the communicating with the reconfigurable logic chip via the second port including,
transmitting, via the second port of the storage, the encrypted input data and a command to the reconfigurable logic chip, the command commanding data processing with respect to the encrypted input data, and
receiving, via the second port of the storage, encrypted output data from the reconfigurable logic chip; and wherein the communicating with host via the first port further includes transmitting, via the first port, decrypted output data to the host, and wherein the reconfigurable logic chip is configured to change from a first accelerator to a second accelerator.

* * * * *